(12) United States Patent
Batista et al.

(10) Patent No.: US 12,733,688 B2
(45) Date of Patent: Sep. 15, 2026

(54) AEROSOL-GENERATING SYSTEM HAVING ELECTROMAGNETIC INFORMATION MARKERS

(71) Applicant: PHILIP MORRIS PRODUCTS S.A., Neuchatel (CH)

(72) Inventors: Rui Nuno Rodrigues Alves Batista, Morges (CH); Alexandra Sereda, Zurich (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 19/134,254

(22) PCT Filed: Dec. 19, 2023

(86) PCT No.: PCT/EP2023/086732
§ 371 (c)(1),
(2) Date: May 30, 2025

(87) PCT Pub. No.: WO2024/133327
PCT Pub. Date: Jun. 27, 2024

(65) Prior Publication Data

US 2026/0198595 A1 Jul. 16, 2026

(30) Foreign Application Priority Data

Dec. 23, 2022 (EP) .................................... 22216594

(51) Int. Cl.
*A24F 40/53* (2020.01)
*A24F 40/42* (2020.01)
*G06K 19/07* (2006.01)

(52) U.S. Cl.
CPC ............. *A24F 40/53* (2020.01); *A24F 40/42* (2020.01); *G06K 19/0723* (2013.01)

(58) Field of Classification Search
CPC ...... A24F 40/53; A24F 40/42; G06K 19/0723
See application file for complete search history.

(56) References Cited

U.S. PATENT DOCUMENTS 10,143,233 B2 * 12/2018 Dubief .................... A24F 40/46
11,134,715 B2 * 10/2021 Holtz ........................ A24F 1/00
(Continued)

FOREIGN PATENT DOCUMENTS

CA 3095817 A1 * 10/2019 ............ A61M 15/06
CA 3115794 A1 * 4/2020 ............. A24F 40/42
(Continued)

OTHER PUBLICATIONS

PCT Search Report and Written Opinion for PCT/EP2023/086732 dated Feb. 27, 2024 (17 pages).
(Continued)

*Primary Examiner* — Tuyen K Vo
(74) *Attorney, Agent, or Firm* — Mueting Raasch Group

(57) ABSTRACT

An aerosol-generating system comprising a cartridge (10) and an aerosol-generating device (100), the cartridge (10) comprising: an aerosol-forming substrate (14); a cartridge body (12) for holding the aerosol-forming substrate (14); and a first electromagnetic information marker (30); the aerosol-generating device (100) comprising: a housing (102) having a cavity (108) configured to receive at least a portion of the cartridge (10); and a second electromagnetic information marker (114); wherein the first (30) and second (114) electromagnetic information markers are positioned such that, when the at least a portion of the cartridge (10) is received within the cavity (108) of the aerosol-generating device (100), the first electromagnetic information marker (30) at least partially overlaps the second electromagnetic information marker (114) to enable information stored by the first electromagnetic information marker (30) to be read
(Continued)

by magnetic interaction with the second electromagnetic information marker (114).

11 Claims, 6 Drawing Sheets

(56) References Cited

U.S. PATENT DOCUMENTS

| | | | | |
|---|---|---|---|---|
| 2018/0184713 | A1* | 7/2018 | Mironov | A24F 40/30 |
| 2020/0120982 | A1 | 4/2020 | Tanabe | |
| 2021/0345674 | A1* | 11/2021 | Emmett | A24F 1/30 |
| 2021/0386115 | A1 | 12/2021 | Holtz | |
| 2023/0165301 | A1* | 6/2023 | Batista | A24C 5/005 131/280 |
| 2023/0210179 | A1* | 7/2023 | Williamson | A24F 40/10 131/329 |
| 2024/0407467 | A1* | 12/2024 | Moloney | A24F 40/65 |

FOREIGN PATENT DOCUMENTS

| | | | | |
|---|---|---|---|---|
| CA | 3145730 | A1 * | 1/2021 | A24F 40/48 |
| CA | 3124046 | C * | 8/2025 | |
| EP | 1307865 | | 4/2005 | |
| EP | 1422168 | | 2/2006 | |
| WO | WO 2021/191053 | | 9/2021 | |
| WO | WO 2021/219730 | | 11/2021 | |
| WO | WO-2023017002 | A1 * | 2/2023 | A24F 40/57 |

OTHER PUBLICATIONS

International Preliminary Report on Patentability for PCT/EP2023/086732 dated Nov. 27, 2024 (18 pages).

Extended European Search Report for Application No. 22216594.6 dated May 25, 2023 (9 pages).

* cited by examiner

AEROSOL-GENERATING SYSTEM HAVING ELECTROMAGNETIC INFORMATION MARKERS

This application is the § 371 U.S. National Stage of International Application No. PCT/EP2023/086732 filed Dec. 19, 2023, which claims the priority to European Application No. 22216594.6 filed Dec. 23, 2022. The disclosure of any priority document claimed is incorporated by reference herein in its entirety.

The present disclosure relates to an aerosol-generating system comprising an electromagnetic information marker for storing data such as an identity of a product. In particular, but not exclusively, the present disclosure relates to providing an electromagnetic information marker in a handheld electrically operated aerosol-generating system for heating an aerosol-forming substrate to generate an aerosol and for delivering the aerosol into the mouth of a user. The present disclosure also relates to a cartridge having an electromagnetic information marker and an aerosol-generating device having an electromagnetic information marker.

Handheld electrically operated aerosol-generating systems can have a modular construction comprising an aerosol-generating device and a removable cartridge. In known aerosol-generating systems the aerosol-generating device typically comprises a battery and control electronics and the cartridge comprises a liquid storage portion holding a supply of liquid aerosol-forming substrate and an electric heater. The heater typically comprises a coil of wire which is wound around an elongate wick which transfers liquid aerosol-forming substrate from the liquid storage portion to the heater. An electric current can be passed through the coil of wire to heat the heater and thereby generate an aerosol from the aerosol-forming substrate. The cartridge generally also comprises a mouthpiece through which a user may draw aerosol into their mouth.

Cartridges are typically interchangeable and can comprise a range of different aerosol-forming substrates, which may vary considerably in composition, flavour, strength or other characteristics. The conditions required to aerosolise a certain aerosol-forming substrate or produce a certain user experience may vary from cartridge to cartridge and may depend on the characteristics of the aerosol-forming substrate. A user is able to use their aerosol-generating device with cartridges supplied by the manufacturer of the device, which cartridges are specifically configured to be used with the manufacturer's device and comply with rigorous quality assurance standards and safety regulations to ensure a satisfactory user experience. However, a user may also be able to use their aerosol-generating device with cartridges manufactured by third parties, which cartridges may not meet the same quality assurance standards and safety regulations or may even be counterfeit. Use of third party cartridges may therefore result in an unsatisfactory user experience or, in the worst case, may be potentially unsafe.

Furthermore, there is currently no means of securely recording information about a cartridge, such as the manufacturer's details, on the cartridge itself. In addition, if an abnormal event has occurred during the use of a cartridge, there is currently no means of recording information about such an event on the cartridge so that mitigating measures can be taken the next time that cartridge is used.

It would be desirable to provide a means for identifying a cartridge so that an aerosol-generating device can adapt its aerosolization conditions to the specific cartridge being used and so that third party or counterfeit cartridges can be identified. It would be desirable to provide a means for storing information or data on a cartridge of an aerosol-generating system.

According to an example of the present disclosure, there is provided an aerosol-generating system. The aerosol-generating system may comprise a cartridge. The aerosol-generating system may comprise an aerosol-generating device. The cartridge may comprise an aerosol-forming substrate. The cartridge may comprise a cartridge body. The cartridge body may hold the aerosol-forming substrate. The cartridge may comprise a first electromagnetic information marker. The aerosol-generating device may comprise a housing. The housing may have a cavity. The cavity may be configured to receive at least a portion of the cartridge. The aerosol-generating device may comprise a second electromagnetic information marker. The first and second electromagnetic information markers may be positioned such that, when the at least a portion of the cartridge is received within the cavity of the aerosol-generating device, the first electromagnetic information marker at least partially overlaps the second electromagnetic information marker. This may enable information stored by the first electromagnetic information marker to be read by magnetic interaction with the second electromagnetic information marker.

According to an example of the present disclosure, there is provided an aerosol-generating system comprising a cartridge and an aerosol-generating device. The cartridge comprises an aerosol-forming substrate, a cartridge body for holding the aerosol-forming substrate; and a first electromagnetic information marker. The aerosol-generating device comprises a housing having a cavity configured to receive at least a portion of the cartridge; and a second electromagnetic information marker. The first and second electromagnetic information markers are positioned such that, when the at least a portion of the cartridge is received within the cavity of the aerosol-generating device, the first electromagnetic information marker at least partially overlaps the second electromagnetic information marker to enable information stored by the first electromagnetic information marker to be read by magnetic interaction with the second electromagnetic information marker.

As used herein, the term "electromagnetic information marker" refers to an information or data carrier in which information or data is stored or represented by an electromagnetic characteristic of the carrier or can be read by electromagnetic means, for example, an electromagnetic field. The carrier, or a portion of the carrier, may be magnetic or magnetisable in order to store or represent data or information. The information stored or represented by the electromagnetic information marker may be read by magnetic interaction with another electromagnetic information marker, for example, when an electromagnetic field is applied to the electromagnetic information markers. The carrier may form a marking or indicia, or part of a marking or indicia, on a surface. The electromagnetic characteristics of the carrier may be determined by the material composition and the shape and structure of the carrier.

Advantageously, the first electromagnetic information marker can be used to store information about the cartridge, for example, the identity of the cartridge and an indication of its contents. This information can be read by the aerosol-generating device by magnetic interaction with the second electromagnetic information marker arranged in the aerosol-generating device when the cartridge is received within the aerosol-generating device. This information may help the aerosol-generating device to identify or recognise the cartridge being used and to adapt its operating parameters, for example, the heating profile for the cartridge, appropriately. An absence of an electromagnetic information marker on the cartridge or third party information stored within an electromagnetic information marker on a cartridge may help to identify a third party cartridge and, if needed, may prevent the use of such third party cartridges in order to ensure a safe and satisfactory user experience.

A further advantage of the aerosol-generating system of the present disclosure is that it provides a means of storing data on the cartridge both during production and use to provide information regarding the origin of the cartridge and also usage data regarding the user's use of the cartridge. Such data can also be collected from the cartridge at a later date to provide a user with information regarding their use of the aerosol-generating system. The electromagnetic information marker can be added to the cartridge during manufacture and can be applied directly to a surface of the cartridge, or embedded within the body of the cartridge, and is therefore more secure than other identification means such as stickers or tags which are generally applied after manufacture. Moreover, unlike other identification means such as radio frequency identification (RFID) tags, the electromagnetic information marker does not require additional electronic components and is therefore cheaper and simpler to produce and is suited to high speed manufacturing environments.

The cartridge body may comprise a connection portion. The connection portion may be configured to be received within the cavity of the aerosol-generating device. The first electromagnetic information marker may be disposed at, or in proximity to, a surface of the connection portion. The first electromagnetic information marker may be disposed on a surface of the connection portion. Advantageously, by disposing the first electromagnetic information marker on a surface of the connection portion, the first electromagnetic information marker can be brought into overlapping proximity with the second electromagnetic information marker upon connection of the cartridge with the aerosol-generating device.

The first electromagnetic information marker may be embedded or underly a surface of the connection portion. Advantageously, by embedding or otherwise arranging the first electromagnetic information marker below the surface of the connection portion, that is, within a wall of the connection portion, the tamper resistance of the aerosol-generating system may be improved and the first electromagnetic information marker does not alter the surface or dimensions of the connection portion.

The second electromagnetic information marker may be disposed at, or in proximity to, a surface of the cavity. The second electromagnetic information marker may be disposed on a surface of the cavity. The surface of the cavity may oppose the surface of the connection portion on which the first electromagnetic information marker is disposed. Advantageously, by disposing the second electromagnetic information marker on a surface of the cavity, the second electromagnetic information marker can be brought into overlapping proximity with the first electromagnetic information marker upon connection of the cartridge with the aerosol-generating device.

The second electromagnetic information marker may be embedded or underly a surface of the cavity. Advantageously, by embedding or otherwise arranging the second electromagnetic information marker below the surface of the cavity, that is, within a wall of the cavity, the tamper resistance of the aerosol-generating system may be improved and the second electromagnetic information marker does not alter the surface or dimensions of the cavity.

The first and second electromagnetic information markers may be disposed on planar surfaces of the connection portion and cavity respectively. Advantageously, planar surfaces on both the connection portion and within the cavity may help to provide a stable mechanical connection between the cartridge and the aerosol-generating device. Furthermore, a planar surface makes it easier to achieve alignment or overlap between the first and second electromagnetic information markers.

The first and second electromagnetic information markers may be disposed on rigid surfaces of the connection portion and cavity respectively. As used herein, the term "rigid" surface refers to a relatively inflexible surface that is capable of maintaining its shape or form under normal usage of the aerosol-generating system. Disposing the first and second electromagnetic information markers on rigid surfaces of the connection portion and cavity respectively has the advantage of providing a stable foundation for the first and second electromagnetic information markers and may help to reduce relative movement between the first and second electromagnetic information markers so that the first and second electromagnetic information markers are maintained in a sufficiently overlapped configuration. A further advantage of providing the connection portion and cavity with rigid surfaces is that may help to further enhance the mechanical stability of the connection between the cartridge and the aerosol-generating device.

The first and second electromagnetic information markers may comprise a metallic ink. The metallic ink may be deposited on plastic portions of the connection portion and cavity respectively. Advantageously, the metallic ink can be deposited at the time the cartridge is manufactured using standard printing processes as part of the overall manufacturing process, thereby avoiding subsequent manufacturing steps to provide the cartridge with an identification marker. By depositing the metallic ink directly on plastic portions of the connection portion of the cartridge and the cavity of the aerosol-generating device, the first and second electromagnetic information markers can be firmly bonded to the cartridge and aerosol-generating device respectively, reducing the risk of the markers being dislodged inadvertently or purposefully removed. This helps to improve the tamper resistance of the first and second electromagnetic information markers. Furthermore, plastic is a relatively stable and firm surface on which to place the first and second electromagnetic information markers.

It will be appreciated that other suitable materials may be used for the connection portion of the cartridge and the walls of the cavity of the aerosol-generating device. For example, the connection portion or cavity may comprise a metallic material coated with an electrically insulating material such a polymer film or paint. The connection portion or cavity may comprise a metallic foil/polymer laminate. The first and second electromagnetic information markers may be deposited on the electrically insulating material.

The connection portion of the cartridge may have a cuboid shape. Advantageously, a cuboid shape helps to achieve a stable mechanical connection between the cartridge and the aerosol-generating device. Furthermore, a cuboid shape helps to avoid relative rotation between the cartridge and aerosol-generating device so that the first and second electromagnetic information markers remain in a in a sufficiently overlapped configuration.

The connection portion of the cartridge may be configured to make a form-fit connection with the cavity of the aerosol-generating device. The first and second electromagnetic information markers at least partially overlap when the form-fit connection is made. As used herein, the term "form-fit" connection refers to a connection in which the connection portion of the cartridge and the cavity of the aerosol-generating device each have additional geometric features which cooperate to assist in providing a secure connection. For example, the geometric features may comprise shapes which are configured to interlock or engage one another when the cartridge and aerosol-generating device are connected. Advantageously, a form-fit connection helps to retain the cartridge within the aerosol-generating device to reduce the risk of the cartridge being inadvertently dislodged from the aerosol-generating device. The form-fit connection may also accurately locate the connection portion of the cartridge within the cavity of the device to help bring the first and second electromagnetic information markers into an overlapping configuration.

The form-fit connection may be provided by a first geometric feature on the connection portion of the cartridge and a second geometric feature within the cavity. The first and second geometric features may comprise a groove and ridge respectively or vice versa. The first and second geometric features may comprise a depression and projection respectively or vice versa.

The first electromagnetic information marker may be arranged in the region of the first geometric feature. The second electromagnetic information marker may be arranged in the region of the second geometric feature. This arrangement helps to achieve an overlapping arrangement between the first and second electromagnetic information markers when the connection portion of the cartridge is received within the cavity of the aerosol-generating device.

The first geometric feature may be provided on only one surface of the connection portion of the cartridge. The second geometric feature may be provided on only one surface of the cavity of the aerosol-generating device. The one surface of the cavity may oppose the one surface of the cartridge when the connection portion of the cartridge is received within the cavity of the aerosol-generating device. This arrangement may help to ensure that the connection portion of the cartridge is received within the cavity of the aerosol-generating device in only one orientation, that is, the correct orientation.

The first geometric feature may be provided on two opposing surfaces of the connection portion of the cartridge. The second geometric feature may be provided on only one surface, or two opposing surfaces, of the cavity of the aerosol-generating device. This arrangement may allow the connection portion of the cartridge to be received within the cavity of the aerosol-generating device in either of two orientations that 180 degrees different to each other.

In a first preferred example, the first electromagnetic information marker may comprise a first metallic material. The first metallic material may comprise metallic components. The first metallic material may comprise a metallic ink or a metallic paste. The first metallic material may comprise an amorphous metal. The first metallic material may comprise a first metal based alloy. The first metal based alloy may comprise manganese. The first metal based alloy may comprise manganese at 7 to 20 weight percent, or at 9 to 18 weight percent, or at 11 to 15 weight percent. The first metal based alloy may comprise iron (Fe). The first metal based alloy may comprise or be based on one or more of cobalt (Co), chromium (Cr), nickel (Ni), titanium (Ti), and aluminum (AI).

In the first preferred example, the second electromagnetic information marker may comprise a second metallic material. The second metallic material may comprise metallic components. The second metallic material may comprise a metallic ink or a metallic paste. The second metallic material may comprise a second metal based alloy. The second metal based alloy may comprise manganese. The second metal based alloy may comprise manganese at 7 to 20 weight percent, or at 9 to 18 weight percent, or at 11 to 15 weight percent. The second metal based alloy may comprise at least one ferromagnetic material. The second metal based alloy may comprise at least one ferromagnetic material at less than 10 weight percent, or at less than 8 weight percent. The second metal based alloy may comprise iron (Fe). The second metal based alloy may comprise or be based on one or more of cobalt (Co), chromium (Cr), nickel (Ni), titanium (Ti), and aluminium (Al).

In the first preferred example, the second metallic material may have a higher magnetic coercivity than the first metallic material. As used herein, the term "magnetic coercivity" refers to the ability of a material to withstand an external magnetic field without becoming de-magnetized. The magnetic coercivity of the first metallic material may lie in a range from 790 to 7100 amperes per metre, or in a range from 1100 to 5500 amperes per metre. The magnetic coercivity of the second metallic material may be greater than 5500 amperes per metre, or preferably greater than 7100 amperes per metre.

In the first preferred example, the first metallic material may comprise a soft magnetic material. As used herein, a "soft magnetic material" refers to a material that is easily magnetised and demagnetised and typically has an intrinsic magnetic coercivity of less than about 1000 amperes per metre.

In the first preferred example, the second metallic material may comprise a hard magnetic material or a semi-hard magnetic material. As used herein, a "hard magnetic material" refers to a material that retains its magnetism after being magnetised and typically has an intrinsic magnetic coercivity of greater than about 7000 amperes per metre. A semi-hard magnetic material may have an intrinsic magnetic coercivity in the range between 1000 and 7000 amperes per metre.

In the first preferred example, reading the information stored in the first electromagnetic information marker may comprise exposing the first and second electromagnetic information marker to an alternating magnetic field. Reading the information stored in the first electromagnetic information marker may allow information stored in the first electromagnetic information marker to be obtained. The alternating magnetic field may have a frequency in a range of 10 hertz (Hz) to 20 kilohertz (KHz). The alternating magnetic field may have a mixture of frequencies in a range of 10 hertz (Hz) to 20 kilohertz (kHz). If the electromagnetic information marker is subjected to an alternating electromagnetic field, the information marker may emit a response signal.

In the first preferred example, reading the information stored in the first electromagnetic information marker may comprise detecting the response signal of the first and second electromagnetic information markers to the alternating magnetic field. The response signal of the first and second electromagnetic information markers may be in the form of an electromagnetic field. The response signal of the first and second electromagnetic information markers may comprise harmonic excitation frequencies. Reading the information stored in the first electromagnetic information marker may comprise determining the presence or absence of a response signal of the first and second electromagnetic information markers to the alternating magnetic field. By determining whether the first and second electromagnetic information markers emit a response signal to the alternating electromagnetic field, or do not emit a response signal to the alternating electromagnetic field, binary-type information can be obtained. The binary-type information may encode information about the cartridge such as the identity of the cartridge. Alternatively, the characteristics of the response signal itself may be used to identify the cartridge.

In the first preferred example, the response signal of the first and second electromagnetic information markers may be emitted when the second metallic material is demagnetised. The response signal of the first and second electromagnetic information markers may be deactivated by magnetising the second metallic material. The response signal of the first and second electromagnetic information markers may be deactivated by permanently magnetising the second metallic material. Magnetising the second metallic material may allow information to be written to the aerosol-generating system.

In a second preferred example, the first electromagnetic information marker may comprise a first metallic material. The first metallic material may comprise metallic components. The first metallic material may comprise a metallic ink or a metallic paste. The first metallic material may comprise an amorphous metal. The first metallic material may comprise a magnetostrictive material. The first metallic material may comprise a first metal based alloy. The first metal based alloy may comprise manganese. The first metal based alloy may comprise manganese at 7 to 20 weight percent, or at 9 to 18 weight percent, or at 11 to 15 weight percent. The first metal based alloy may comprise at least one ferromagnetic material. The first metal based alloy may comprise at least one ferromagnetic material at less than 10 weight percent, or at less than 8 weight percent. The first metal based alloy may comprise iron (Fe). The first metal based alloy may comprise or be based on one or more of cobalt (Co), chromium (Cr), nickel (Ni), titanium (Ti), and aluminium (Al).

In the second preferred example, the first electromagnetic information marker may have a resonant frequency. The resonant frequency may be characteristic of the materials used to form the first electromagnetic information marker.

In the second preferred example, the second electromagnetic information marker may comprise a second metallic material. The second metallic material may comprise metallic components. The second metallic material may comprise a metallic ink or a metallic paste. The second metallic material may comprise a second metal based alloy. The second metal based alloy may comprise manganese. The second metal based alloy may comprise manganese at 7 to 20 weight percent, or at 9 to 18 weight percent, or at 11 to 15 weight percent. The second metal based alloy may comprise at least one ferromagnetic material. The second metal based alloy may comprise at least one ferromagnetic material at less than 10 weight percent, or at less than 8 weight percent. The second metal based alloy may comprise iron (Fe). The second metal based alloy may comprise or be based on one or more of cobalt (Co), chromium (Cr), nickel (Ni), titanium (Ti), and aluminium (Al).

In the second preferred example, the second metallic material may have a higher magnetic coercivity than the first metallic material. The magnetic coercivity of the first metallic material may lie in a range from 790 to 7100 amperes per metre, or in a range from 1100 to 5500 amperes per metre. The magnetic coercivity of the second metallic material may be greater than 5500 amperes per metre, or preferably greater than 7100 amperes per metre.

In the second preferred example, the first metallic material may comprise a soft magnetic material. The second metallic material may comprise a hard magnetic material or a semi-hard magnetic material.

In the second preferred example, the first electromagnetic information marker may exhibit magnetostriction. As used herein, the term "magnetostriction" refers to a property of magnetic materials that causes them to change their shape or dimensions during the process of magnetization. If the first electromagnetic information marker exhibits magnetostriction, application of an external magnetic field will cause the first electromagnetic information marker to change its shape or dimension. This may lead to a magnetic response signal that may be detected.

In the second preferred example, reading the information stored in the first electromagnetic information marker may comprise exposing the first and second electromagnetic information marker to an alternating magnetic field. Reading the information stored in the first electromagnetic information marker may allow information stored in the first electromagnetic information marker to be obtained. The alternating magnetic field may have a frequency substantially equal to the resonant frequency of the first electromagnetic information marker. The alternating magnetic field may have a frequency in a range of 10 hertz (Hz) to 60 kilohertz (kHz). If the electromagnetic information marker is exposed to an alternating electromagnetic field, the information marker may emit a response signal.

Exposing the first and second electromagnetic information markers to the alternating magnetic field may comprise carrying out a frequency sweep with the alternating magnetic field. The frequency of the alternating magnetic field may be swept through a range between 10 Hertz (Hz) and 60 Kilohertz (kHz), or a subrange of the range between 10 Hertz (Hz) and 60 Kilohertz (kHz). If a frequency sweep is carried out, one or more resonance frequencies of the electromagnetic information marker may be determined.

In the second preferred example, reading the information stored in the first electromagnetic information marker may comprise detecting the response signal of the first and second electromagnetic information markers to the alternating magnetic field. The response signal of the first and second electromagnetic information markers may be in the form of an electromagnetic field. The response signal of the first and second electromagnetic information markers may comprise a resonant frequency. Reading the information stored in the first electromagnetic information marker may comprise determining the presence or absence of a response signal of the first and second electromagnetic information markers to the alternating magnetic field. By determining whether the first and second electromagnetic information markers emit a response signal to the alternating electromagnetic field, or do not emit a response signal to the alternating electromagnetic field, binary-type information can be obtained. The binary-type information may encode information about the cartridge such as the identity of the cartridge. Alternatively, the characteristics of the response signal itself may be used to identify the cartridge.

In the second preferred example, the response signal of the first and second electromagnetic information markers may be emitted when the second metallic material is magnetised. The response signal of the first and second electromagnetic information markers may be deactivated by demagnetising the second metallic material. Demagnetising the second metallic material may allow information to be written to the aerosol-generating system.

The first electromagnetic information marker or second electromagnetic information marker may have any suitable form or structure. For example, the first electromagnetic information marker or second electromagnetic information marker may comprise a continuous line or a broken line comprising a plurality of line segments. It will be appreciated that other forms or structures for the first electromagnetic information marker or second electromagnetic information marker may also be used.

The first electromagnetic information marker may comprise a plurality of first electromagnetic information sub-markers. The second electromagnetic information marker may comprise a corresponding plurality of second electromagnetic information sub-markers. The first and second electromagnetic information markers may be positioned such that, when the at least a portion of the cartridge is received within the cavity of the aerosol-generating device, each of the plurality of first electromagnetic information sub-markers at least partially overlaps a corresponding one of the plurality of second electromagnetic information sub-markers. Each pair of corresponding first and second electromagnetic information sub-markers may produce a response signal that is different to the other pairs corresponding first and second electromagnetic information sub-markers. The response signal of each pair of corresponding first and second electromagnetic information markers may comprise a distinctive set of harmonic excitation frequencies. The response signal of each pair of corresponding first and second electromagnetic information markers may comprise a distinctive resonant frequency. Advantageously, by providing a plurality of first electromagnetic information sub-markers and a corresponding plurality of second electromagnetic information sub-markers, more information can be stored or encoded.

Each first electromagnetic information sub-marker and a corresponding one of the second electromagnetic information sub-markers together store 1 bit of data. Advantageously, any suitable number of first electromagnetic information sub-markers and second electromagnetic information sub-markers may be provided to allow any suitable number of bits to be stored or encoded.

The first electromagnetic information sub-markers or second electromagnetic information sub-markers may have any suitable form or structure. For example, the first electromagnetic information sub-markers or second electromagnetic information sub-markers may comprise a continuous line or a broken line comprising a plurality of line segments. It will be appreciated that other forms or structures for the first electromagnetic information sub-markers or second electromagnetic information sub-markers may also be used.

The first and second electromagnetic information markers or sub-markers may be positioned such that, when the connection portion of the cartridge is received within the cavity of the aerosol-generating device, the first electromagnetic information marker is in contact with the second electromagnetic information marker or each first electromagnetic information sub-marker is in contact with a corresponding one of the second electromagnetic information sub-markers.

The first and second electromagnetic information markers or sub-markers may be positioned such that, when the connection portion of the cartridge is received within the cavity of the aerosol-generating device, there is a separation or distance between the first and second electromagnetic information markers or sub-markers. The distance may be in the range of 0.5 millimetres to 5 millimetres, and is preferably about 1 millimetre to about 3 millimetres.

According to another example of the present disclosure, there is provided a cartridge for an aerosol-generating device. The cartridge may be configured to be removably connectable to an aerosol-generating device. The cartridge may comprise an aerosol-forming substrate. The cartridge may comprise a cartridge body for holding the aerosol-forming substrate. The cartridge body may comprise a connection portion configured to be received within an aerosol-generating device. The cartridge may comprise a first electromagnetic information marker. The first electromagnetic information marker may be disposed on a surface of the connection portion.

According to another example of the present disclosure, there is provided a cartridge for an aerosol-generating device. The cartridge is configured to be removably connectable to an aerosol-generating device. The cartridge comprises an aerosol-forming substrate. The cartridge comprises a cartridge body for holding the aerosol-forming substrate. The cartridge body comprises a connection portion configured to be received within an aerosol-generating device. The cartridge comprises a first electromagnetic information marker. The first electromagnetic information marker is disposed on a surface of the connection portion.

As used herein, the term "aerosol-forming substrate" refers to a substrate capable of releasing volatile compounds that can form an aerosol. Volatile compounds may be released by heating the liquid aerosol-forming substrate.

The aerosol-forming substrate may be liquid at room temperature. The aerosol-forming substrate may comprise both liquid and solid components. The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise a tobacco-containing material containing volatile tobacco flavour compounds, which are released from the aerosol-forming substrate upon heating. The liquid aerosol-forming substrate may comprise homogenised tobacco material. The liquid aerosol-forming substrate may comprise a non-tobacco-containing material. The liquid aerosol-forming substrate may comprise homogenised plant-based material.

The liquid aerosol-forming substrate may comprise one or more aerosol-formers. An aerosol-former is any suitable known compound or mixture of compounds that, in use, facilitates formation of a dense and stable aerosol and that is substantially resistant to thermal degradation at the temperature of operation of the system. Examples of suitable aerosol formers include glycerine and propylene glycol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. The liquid aerosol-forming substrate may comprise water, solvents, ethanol, plant extracts and natural or artificial flavours.

The liquid aerosol-forming substrate may comprise nicotine and at least one aerosol-former. The aerosol-former may be glycerine or propylene glycol. The aerosol former may comprise both glycerine and propylene glycol. The liquid aerosol-forming substrate may have a nicotine concentration of between about 0.5% and about 10%, for example about 2%.

The cartridge may comprise a heater assembly. The heater assembly may comprise a heating element for heating the aerosol-forming substrate. The heating element may have any suitable shape or geometry. For example, the heating element may be straight, formed as a coil or have an undulating or meandering shape. The heating element may comprise a heating wire or filament. The heating element may comprise a substantially flat heating element to allow for simple manufacture. The heater assembly may comprise a plurality of heating elements.

The heating element may be formed from any material with suitable electrical properties. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group.

Examples of suitable metal alloys include stainless steel, constantan, nickel-, cobalt-, chromium-, aluminium-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation. The filaments may be coated with one or more insulators. Preferred materials for the electrically conductive filaments are stainless steel and graphite, more preferably 300 series stainless steel like AISI 304, 316, 304L, 316L. Additionally, the electrically conductive heating element may comprise combinations of the above materials. A combination of materials may be used to improve the control of the resistance of the substantially flat heating element. For example, materials with a high intrinsic resistance may be combined with materials with a low intrinsic resistance. This may be advantageous if one of the materials is more beneficial from other perspectives, for example price, machinability or other physical and chemical parameters. Advantageously, high resistivity heaters allow more efficient use of battery energy.

The heating element may be a fluid-permeable heating element. The fluid permeable heating element may comprise a plurality of interstices or apertures extending from a first side to a second side of the heating element and through which fluid may pass.

The heating element may comprise an array of filaments, for example arranged parallel to each other. Preferably, the filaments may form a mesh. The mesh may be woven or non-woven.

The heater assembly may comprise a transport material for conveying liquid aerosol-forming substrate to the heating element. The transport material may comprise a capillary or porous material.

The cartridge may have a mouthpiece arranged at a mouth end of the cartridge. The mouth piece may have an aerosol outlet through which generated aerosol may be drawn by a user.

The cartridge may comprise an air inlet. The cartridge may comprise an enclosed airflow passage from the air inlet to the aerosol outlet. The enclosed airflow passage may extend from the air inlet, past the heater assembly, to the aerosol outlet. The enclosed airflow passage may pass around an external surface of the liquid storage portion. Alternatively, the enclosed airflow passage may pass through the liquid storage portion. For example, the liquid storage portion may have an annular cross-section defining an internal passage, and the airflow passage may extend through the internal passage of the liquid storage portion.

The cartridge body may be formed from a durable material. The cartridge body may be formed from a liquid impermeable material. The cartridge body may be formed form a mouldable plastics material, such as polypropylene (PP), polyetheretherketone (PEEK) or polyethylene terephthalate (PET). The cartridge body of the cartridge may define a portion of a liquid storage portion or reservoir for holding the liquid aerosol-forming substrate. The cartridge body may define the liquid storage portion. The cartridge body and the liquid storage portion may be integrally formed. Alternatively, the liquid storage portion may be formed separately from the cartridge body and arranged in the cartridge body.

According to another example of the present disclosure, there is provided an aerosol-generating device. The aerosol-generating device may comprise a housing. The housing may have a cavity. The cavity may be configured to receive at least a connection portion of one of the cartridges described above. The aerosol-generating device may comprise a second electromagnetic information marker. The second electromagnetic information marker may be disposed on a surface of the cavity.

According to another example of the present disclosure, there is provided an aerosol-generating device. The aerosol-generating device comprises a housing having a cavity configured to receive at least a connection portion of one of the cartridges described above. The aerosol-generating device also comprises a second electromagnetic information marker. The second electromagnetic information marker may be disposed on a surface of the cavity.

The aerosol-generating device may further comprise a data reader. The data reader may be configured to apply an alternating magnetic field to the first and second electromagnetic information markers when the connection portion of the cartridge is received in the cavity.

The data reader may comprise an induction coil. The induction coil may be configured to apply or transmit an alternating magnetic field to the first and second electromagnetic information markers. The induction coil may be configured to both apply or transmit an alternating magnetic field to the first and second electromagnetic information markers and to detect or receive a response signal from the first and second electromagnetic information markers. The data reader may comprise a plurality of induction coils. An induction coil may be provided for each pair of corresponding first and second electromagnetic information markers or sub-markers.

The data reader may comprise a pair of induction coils. The pair of induction coils may comprise a first or transmitter coil configured to apply or transmit an alternating magnetic field to the first and second electromagnetic information markers. The pair of induction coils may comprise a second or receiver coil configured to detect or receive a response signal from the first and second electromagnetic information markers.

The data reader may comprise a plurality of pairs of induction coils as described above. A pair of induction coils may be provided for each pair of corresponding first and second electromagnetic information markers or sub-markers.

The induction coil or coils may have any suitable shape or form. The induction coil or coils may helical. The induction coil or coils may be flat and spiral-shaped. The induction coils may have a shape substantially similar to the first and second electromagnetic information markers or sub-markers. The induction coil or coils may extend around a perimeter of the cavity of the aerosol-generating device. The induction coil or coils may extend around an external perimeter or an internal perimeter of the cavity of the aerosol-generating device. The induction coil or coils may be arranged on a wall of the cavity or may be embedded within a wall of the cavity.

The data reader may be configured to read data from the first and second electromagnetic information markers by monitoring a response signal of the first and second electromagnetic information markers. The data reader may be configured to detect a response signal comprising harmonic excitation frequencies. The data reader may be configured to detect a response signal comprising a resonant frequency.

The data reader may be connected to control circuitry and be configured to pass the response signal to the control circuitry to process the response signal.

The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material is preferably light and non-brittle.

The housing may contain a power supply. The power supply may be any suitable power supply. Preferably, the power supply is a DC power supply. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may be rechargeable and be configured for many cycles of charge and discharge. The power supply may have a capacity that allows for the storage of enough energy for one or more user experiences of the aerosol-generating system; for example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations of the aerosol-generating system.

The housing may contain control circuitry. The control circuitry may control the supply of electrical power from the power supply to the heating element. The control circuitry may monitor the response signal from the first and second electromagnetic information markers or sub-markers.

The control circuitry may comprise any suitable controller or electrical components. The controller may comprise a memory. Information for performing the above-described method may be stored in the memory. The control circuitry may comprise a microprocessor. The microprocessor may be a programmable microprocessor, a microcontroller, or an application specific integrated chip (ASIC) or other electronic circuitry capable of providing control. The control circuitry may be configured to supply power to the heating element continuously following activation of the device, or may be configured to supply power intermittently, such as on a puff-by-puff basis. The power may be supplied to the heating element in the form of pulses of electrical current, for example, by means of pulse width modulation (PWM).

The control circuit may be configured to prevent operation of the aerosol-generating device if it detects a non-conforming cartridge, for example, if the cartridge is counterfeit or is incompatible with the aerosol-generating device or is damaged.

The control circuitry may comprise further electronic components. For example, in some embodiments, the control circuitry may comprise any of: sensors, switches, display elements.

The aerosol-generating system may comprise a puff detector. The puff detector may be configured to detect when a user draws on the aerosol-generating system. The puff detector may be any suitable sensor that is capable of detecting when a user draws on the aerosol-generating device. For example, the puff detector may be an airflow sensor. The control circuitry may be configured to supply power to the heating element when the puff detector detects a user drawing on the aerosol-generating system.

According to another example of the present disclosure, there is provided a method of manufacturing an aerosol-generating system. The method may comprise providing a cartridge comprising an aerosol-forming substrate. The cartridge may have a cartridge body for holding the aerosol-forming substrate. The method may comprise providing a first electromagnetic information marker. The method may comprise writing information to the first electromagnetic information marker to store information in the first electromagnetic information marker. The method may comprise providing an aerosol-generating device. The aerosol-generating device may comprise a housing having a cavity configured to receive at least a portion of the cartridge.

The method may comprise providing a second electromagnetic information marker. The method may comprise positioning the second electromagnetic information markers such that, when the at least a portion of the cartridge is received within the cavity of the aerosol-generating device, the first electromagnetic information marker at least partially overlaps the second electromagnetic information marker to enable the information stored by the first electromagnetic information marker to be read by magnetic interaction with the second electromagnetic information marker.

The first electromagnetic information marker may be printed or deposited on a surface of the cartridge. The second electromagnetic information marker may be printed or deposited on a surface of the cavity.

Features described in relation to one of the above examples may equally be applied to other examples of the present disclosure.

The invention is defined in the claims. However, below there is provided a non-exhaustive list of non-limiting examples. Any one or more of the features of these examples may be combined with any one or more features of another example, embodiment, or aspect described herein.

Example Ex1: An aerosol-generating system comprising a cartridge and an aerosol-generating device, the cartridge comprising: an aerosol-forming substrate; and a cartridge body for holding the aerosol-forming substrate; the aerosol-generating device comprising: a housing having a cavity configured to receive at least a portion of the cartridge.

Example Ex2: An aerosol-generating system according to Example Ex1, further comprising an electromagnetic information system for storing information regarding the cartridge.

Example Ex3: An aerosol-generating system according to Example Ex1 or Ex2, wherein the electromagnetic information system comprises a first electromagnetic information marker.

Example Ex4: An aerosol-generating system according to Example Ex3, wherein the electromagnetic information system comprises a second electromagnetic information marker.

Example Ex5: An aerosol-generating system according to Example Ex4, wherein the information stored by the electromagnetic information system is read by magnetic interaction between the first electromagnetic information marker and the second electromagnetic information marker.

Example Ex6: An aerosol-generating system according to any of Examples Ex3 to Ex5, wherein the cartridge comprises the first electromagnetic information marker.

Example Ex7: An aerosol-generating system according to Example Ex6, wherein the first electromagnetic information marker stores information regarding the cartridge.

Example Ex8: An aerosol-generating system according to any of Examples Ex4 to Ex6, wherein the aerosol-generating device comprises the second electromagnetic information marker.

Example Ex9: An aerosol-generating system according to Example Ex7 or Ex8, wherein the first and second electromagnetic information markers are positioned such that, when the at least a portion of the cartridge is received within the cavity of the aerosol-generating device, the first electromagnetic information marker at least partially overlaps the second electromagnetic information marker to enable information stored by the first electromagnetic information marker to be read by magnetic interaction with the second electromagnetic information marker.

Example Ex10: An aerosol-generating system according to any of Examples Ex1 to Ex9, wherein the cartridge body comprises a connection portion configured to be received within the cavity of the aerosol-generating device.

Example Ex11: An aerosol-generating system according to Example Ex10, wherein the first electromagnetic information marker is disposed on a surface of the connection portion.

Example Ex12: An aerosol-generating system according to Example Ex10, wherein the first electromagnetic information marker may be embedded or underly a surface of the connection portion.

Example Ex13: An aerosol-generating system according to any of Examples Ex10 to Ex12, wherein the second electromagnetic information marker is disposed on a surface of the cavity.

Example Ex14: An aerosol-generating system according to Example Ex13, wherein the surface of the cavity on which the second electromagnetic information marker is disposed opposes the surface of the connection portion on which the first electromagnetic information marker is disposed when the connection portion is received within the cavity of the aerosol-generating device.

Example Ex15: An aerosol-generating system according to any of Examples Ex10 to Ex12, wherein the second electromagnetic information marker may be embedded or underly a surface of the cavity.

Example Ex16: An aerosol-generating system according to any of Examples Ex10 to Ex15, wherein the first and second electromagnetic information markers are disposed on planar surfaces of the connection portion and cavity respectively.

Example Ex17: An aerosol-generating system according to any of Examples Ex10 to Ex16, wherein the first and second electromagnetic information markers are disposed on rigid surfaces of the connection portion and cavity respectively.

Example Ex18: An aerosol-generating system according to any of Examples Ex10 to Ex17, wherein the first and second electromagnetic information markers comprise a metallic ink deposited on plastic portions of the connection portion and cavity respectively.

Example Ex19: An aerosol-generating system according to any of Examples Ex10 to Ex18, wherein the connection portion of the cartridge has a cuboid shape.

Example Ex20: An aerosol-generating system according to any of Examples Ex10 to Ex19, wherein the connection portion of the cartridge is configured to make a form-fit connection with the cavity of the aerosol-generating device.

Example Ex21: An aerosol-generating system according to Example Ex20, wherein the first and second electromagnetic information markers at least partially overlap when the form-fit connection is made.

Example Ex22: An aerosol-generating system according to Example Ex21 or Ex22, wherein the form-fit connection is provided by a first geometric feature on the connection portion of the cartridge and a second geometric feature within the cavity.

Example Ex23: An aerosol-generating system according to Example Ex22, wherein the first and second geometric features comprise a groove and ridge respectively or vice versa.

Example Ex24: An aerosol-generating system according to Example Ex22, wherein the first and second geometric features comprise a depression and projection respectively or vice versa.

Example Ex25: An aerosol-generating system according to any of Examples Ex22 to Ex24, wherein the first electromagnetic information marker is arranged in the region of the first geometric feature.

Example Ex26: An aerosol-generating system according to any of Examples Ex22 to Ex25, wherein the second electromagnetic information marker is arranged in the region of the second geometric feature.

Example Ex27: An aerosol-generating system according to any of Examples Ex22 to Ex25, wherein the first geometric feature is provided on only one surface of the connection portion of the cartridge.

Example Ex28: An aerosol-generating system according to any of Examples Ex22 to Ex27, wherein the second geometric feature is provided on only one surface of the cavity of the aerosol-generating device, the one surface of the cavity may oppose the one surface of the cartridge when the connection portion of the cartridge is received within the cavity of the aerosol-generating device.

Example Ex29: An aerosol-generating system according to any of Examples Ex22 to Ex25, wherein the first geometric feature is provided on two opposing surfaces of the connection portion of the cartridge.

Example Ex30: An aerosol-generating system according to any of Examples Ex3 to Ex29, wherein the first electromagnetic information marker comprises a first metallic material Example Ex31: An aerosol-generating system according to Example Ex30, wherein the first metallic material comprises an amorphous metal.

Example Ex32: An aerosol-generating system according to Example Ex30, wherein the first metallic material comprises a magnetostrictive material.

Example Ex33: An aerosol-generating system according to any of Examples Ex3 to Ex32, wherein the second electromagnetic information marker comprises a second metallic material.

Example Ex34: An aerosol-generating system according to Example Ex33, wherein the second metallic material has a higher magnetic coercivity than the first metallic material.

Example Ex35: An aerosol-generating system according to any of Examples Ex3 to Ex34, wherein the first electromagnetic information marker comprises a plurality of first electromagnetic information sub-markers Example Ex36: An aerosol-generating system according to Example Ex35, wherein the second electromagnetic information marker comprises a corresponding plurality of second electromagnetic information sub-markers.

Example Ex37: An aerosol-generating system according to Example Ex36, wherein the first and second electromagnetic information markers are positioned such that, when the at least a portion of the cartridge is received within the cavity of the aerosol-generating device, each of the plurality of first electromagnetic information sub-markers at least partially overlaps a corresponding one of the plurality of second electromagnetic information sub-markers.

Example Ex38: An aerosol-generating system according to Example Ex36 or Ex37, wherein each first electromagnetic information sub-marker and a corresponding one of the second electromagnetic information sub-markers together store 1 bit of data.

Example Ex39: An aerosol-generating system according to any of Examples Ex3 to Ex5, wherein the cartridge comprises both the first and second electromagnetic information markers.

Example Ex40: A cartridge for an aerosol-generating device, the cartridge being configured to be removably connectable to an aerosol-generating device, the cartridge comprising: an aerosol-forming substrate; a cartridge body for holding the aerosol-forming substrate, the cartridge body comprising a connection portion configured to be received within an aerosol-generating device; and a first electromagnetic information marker; wherein the first electromagnetic information marker is disposed on a surface of the connection portion.

Example Ex41: An aerosol-generating device comprising: a housing having a cavity configured to receive at least a connection portion of a cartridge according to Example Ex39; and a second electromagnetic information marker; wherein the second electromagnetic information marker is disposed on a surface of the cavity.

Example Ex42: An aerosol-generating device according to Example Ex41, further comprising a data reader configured to apply an alternating magnetic field to the first and second electromagnetic information markers when the connection portion of the cartridge is received in the cavity.

Example Ex43: An aerosol-generating system according to Example Ex42, wherein the data reader is configured to read data from the first and second electromagnetic information markers by monitoring a response signal of the first and second electromagnetic information markers.

Example Ex44: An aerosol-generating system according to Example Ex43, wherein the data reader is configured to monitor a response signal for harmonic excitation frequencies.

Example Ex45: An aerosol-generating system according to Example Ex43, wherein the data reader is configured to monitor a response signal for a resonant frequency.

Example Ex46: An aerosol-generating system according to any of Examples Ex42 to Ex45, wherein the data reader comprises an induction coil.

Example Ex47: An aerosol-generating system according to Example Ex46, wherein the induction coil is configured to apply or transmit an alternating magnetic field to the first and second electromagnetic information markers.

Example Ex48: An aerosol-generating system according to Example Ex46 or Ex47, wherein the induction coil is configured to both apply or transmit an alternating magnetic field to the first and second electromagnetic information markers and to detect or receive a response signal from the first and second electromagnetic information markers.

Example Ex49: An aerosol-generating system according to any of Examples Ex42 to Ex48, wherein the data reader comprises a pair of induction coils, the pair of induction coils comprising a first or transmitter coil configured to apply or transmit an alternating magnetic field to the first and second electromagnetic information markers and a second or receiver coil configured to detect or receive a response signal from the first and second electromagnetic information markers.

Example Ex50: A method of manufacturing an aerosol-generating system, the method comprising providing a cartridge comprising an aerosol-forming substrate, the cartridge having a cartridge body for holding the aerosol-forming substrate; providing an aerosol-generating device, the aerosol-generating device comprising a housing having a cavity configured to receive at least a portion of the cartridge.

Example Ex51: A method according to Example Ex50, further comprising providing a first electromagnetic information marker.

Example Ex52: A method according to Example Ex51, further comprising writing information to the first electromagnetic information marker to store information in the first electromagnetic information marker.

Example Ex53: A method according to Example Ex51 or Ex52, further comprising providing a second electromagnetic information marker.

Example Ex54: A method according to Example Ex53, further comprising positioning the second electromagnetic information markers such that, when the at least a portion of the cartridge is received within the cavity of the aerosol-generating device, the first electromagnetic information marker at least partially overlaps the second electromagnetic information marker to enable the information stored by the first electromagnetic information marker to be read by magnetic interaction with the second electromagnetic information marker.

Example Ex55: A method according to any of Examples Ex51 to Ex54, wherein the first electromagnetic information marker is printed or deposited on a surface of the cartridge.

Example Ex56: A method according to any of Examples Ex51 to Ex55, wherein the second electromagnetic information marker is printed or deposited on a surface of the cavity.

Examples will now be further described with reference to the figures in which.

Figure 1:
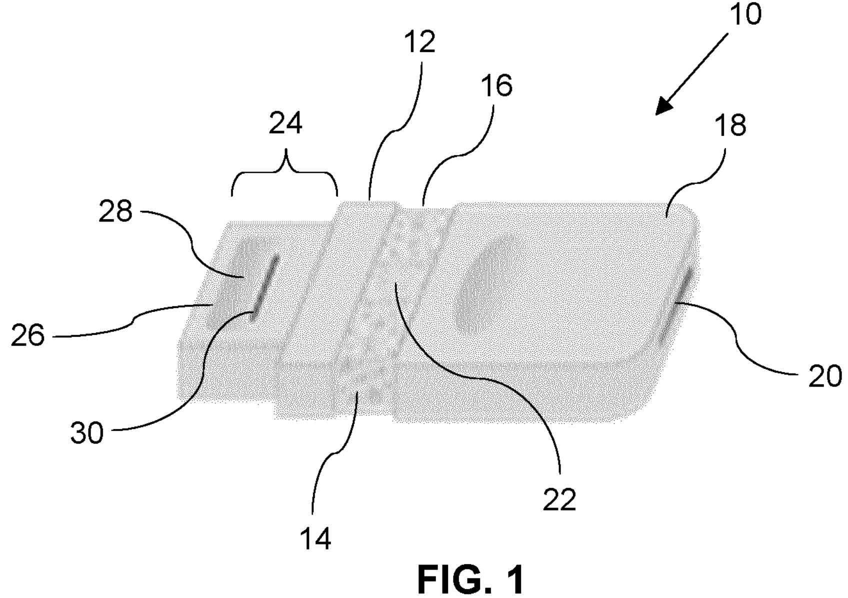
FIG. 1 is a perspective view of a cartridge for an aerosol-generating system according to an example of the present disclosure.
Figure 2:
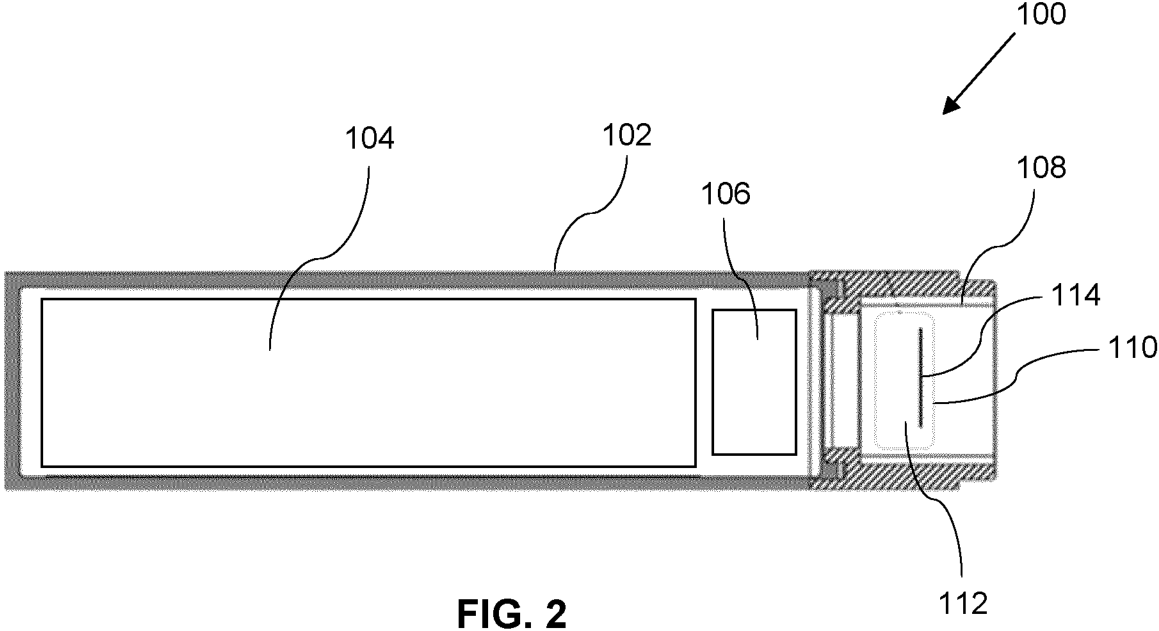
FIG. 2 is a longitudinal cross-sectional view of an aerosol-generating device for use with the cartridge of FIG. 1.

Referring to FIG. 1, there is shown a cartridge 10 for use with the aerosol-generating device 100 of FIG. 2. When combined, the cartridge of FIG. 1 and the aerosol-generating device of FIG. 2 form an aerosol-generating system. The cartridge 10 of FIG. 1 comprises a cartridge body 12 for holding a liquid aerosol-forming substrate 14. The liquid aerosol-forming substrate 14 is held within a reservoir or liquid storage portion 16 of the cartridge body 12. The cartridge 10 also comprises a mouthpiece 18 having an aerosol outlet 20 at a proximal end of the cartridge 10. The mouthpiece 18 is attached to the cartridge body 12. A heating element (not shown) is also provided within the cartridge body for heating the liquid aerosol-forming substrate. The heating element is in fluid communication with the liquid aerosol-forming substrate in the liquid storage portion 16. When heated, the liquid aerosol-forming substrate is vaporised and an aerosol is generated within an aerosolization chamber or space inside the cartridge body 12. The aerosolization chamber is in fluid communication with an air inlet (not shown) and the aerosol outlet 20. When a user takes a puff on the mouthpiece, air from the air inlet entrains aerosol generated in the aerosolization chamber and the aerosol-laden air is conveyed to the aerosol outlet 20 by a central aerosol channel 22 arranged within the cartridge body 12 and which passes through liquid storage portion 16. Aerosol exits the cartridge 10 via the aerosol outlet 20 into the mouth of the user.

The cross-sectional shape of the cartridge 10 is generally rectangular and it has a substantially flat profile which makes it comfortable to be gripped by a user and to be placed between a user's lips. A distal end of the cartridge 10 has a connection portion 24 having a reduced cross-sectional area compared to the remaining part of the cartridge. The connection portion 24 is configured to be received within a cavity 108 of the aerosol-generating device 100. The connection portion 24 has a rectangular cross-section and a cuboid shape and is adapted to fit within the similarly shaped and sized cavity 108 of the aerosol-generating device 100. The planar surfaces and cuboid shape of the connection portion 24 provide a stable mechanical connection between the cartridge 10 and the aerosol-generating device 100. The cartridge body 12 including the connection portion 24 is made from a rigid plastic material such as polyetheretherketone (PEEK), which further enhances the mechanical stability of the connection between the cartridge 10 and aerosol-generating device 100.

One of the faces of the connection portion 24 which spans a width of the connection portion has a sunken region or depression 26, which is arranged to engage a complementary raised region or projection 110 in the cavity 108 of the aerosol-generating device 100 to provide a form-fit connection between the cartridge 10 and the aerosol-generating device 100. The depression 26 is provided on only one side of the connection portion 24 to ensure that the cartridge can only be inserted into the cavity 108 of the aerosol-generating device 100 in one orientation, that is, an orientation in which the depression 26 is brought into mating or interlocking engagement with the projection 110 in the cavity 108 of the aerosol-generating device 100.

The depression 26 has a planar base 28 and has curved or bevelled edges to assist with inserting the connection portion 24 into the cavity 108 of an aerosol-generating device 100. A first electromagnetic information marker 30 is provided on the planar base 28 of the depression 26. The first electromagnetic information marker 30 is configured to store information regarding the cartridge, as will be described in more detail below. The first electromagnetic information marker 30 is formed from a metallic ink which is printed or otherwise deposited onto the planar base 28 of the depression 26. The first electromagnetic information marker 30 comprises a line or strip extending in a widthwise direction across a portion of the connection portion 24. Further details of the materials from which the first electromagnetic information marker 30 is made are provided below with reference to FIG. 8.

An external surface of the connection portion 24 is also provided with electrical contacts (not shown) which are connected to the heating element (not shown). The electrical contacts are arranged to make an electrical contact with corresponding electrical contacts arranged in the cavity of an aerosol-generating device into which the connection portion 24 is inserted. The electrical contacts on the connection portion 24 allow electrical power to be supplied to the heating element.

FIG. 2 shows a longitudinal cross-sectional view of the aerosol-generating device 100. The aerosol-generating device 100 comprises a housing 102 that contains a power supply 104 such as a battery and control circuitry 106. The cavity 108 for receiving the connection portion 24 of the cartridge 10 of FIG. 1 is provided at a proximal end of the housing 102. The power supply 104 is connected via the control circuitry 106 to electrical contacts (not shown) in the cavity 108, which are arranged to make an electrical connection with the electrical contacts arranged on the connection portion 24 of the cartridge 10 of FIG. 1, as described above. The control circuitry 106 controls the supply of electrical power from the power supply 104 to the heating element of the cartridge 10.

As discussed above, the cavity 108 of the aerosol-generating device 100 is shaped and sized to receive the connection portion 24 of the cartridge 10 of FIG. 1. In particular, the interior of the cavity 108 has a rectangular cross-section and a corresponding cuboid shape to the connection portion 24. The interior of the cavity 108 has planar side surfaces. At least the portion of the housing 102 having the cavity 108 is made from a rigid plastic material such as polyetheretherketone (PEEK). A rigid plastic surface helps to enhance the mechanical stability of the connection between the cartridge 10 and aerosol-generating device 100.

As discussed above, one of the sides of the cavity 108 which spans a width of the cavity 108 has a raised region or projection 110, which is arranged to engage the complementary sunken region or depression 26 on the connection portion 24 of the cartridge 10 to provide a form-fit connection between the cartridge 10 and the aerosol-generating device 100. The projection 110 is provided on only one side of the cavity to ensure that the cartridge 10 can only be inserted into the cavity 108 of the aerosol-generating device 100 in one orientation, that is, an orientation in which the depression 26 is brought into mating or interlocking engagement with the projection 110 in the cavity 108 of the aerosol-generating device 100.

The projection has a planar top 112 and has curved or bevelled edges to assist with inserting the cartridge 10 into the cavity 108. A second electromagnetic information marker 114 is provided on the planar top 112 of the projection 110. The second electromagnetic information marker 114 comprises a metallic ink which is printed or otherwise deposited onto the planar top 112 of the projection 110. The second electromagnetic information marker 114 comprises a line or strip extending in a widthwise direction across a portion of the cavity 108. The second electromagnetic marker 114 is positioned in the cavity 108 to correspond to the position of the first electromagnetic information marker 30 on the connection portion 24 of the cartridge 10 of FIG. 1. When the connection portion 24 is received within the cavity 108, the first electromagnetic information marker 30 is aligned parallel with, and substantially overlies or overlaps, the second electromagnetic information marker 114. Further details of the materials from which the second electromagnetic information marker 114 is made are provided below with reference to FIG. 8.

An induction coil (not shown) is also located in the wall of the cavity 108 of the aerosol-generating device 100 in proximity to the second electromagnetic information marker 114. The induction coil is configured to act as a data reader and to provide an alternating magnetic field to the first 30 and second 114 electromagnetic information markers such that the information stored by the first electromagnetic information marker 30 can be read by magnetic interaction between the first 30 and second 114 electromagnetic information markers when the connection portion 24 of the cartridge 10 is received within the cavity 108 of the aerosol-generating device 100, as discussed further below with reference to FIG. 3B.

Figures 3A, 3B:
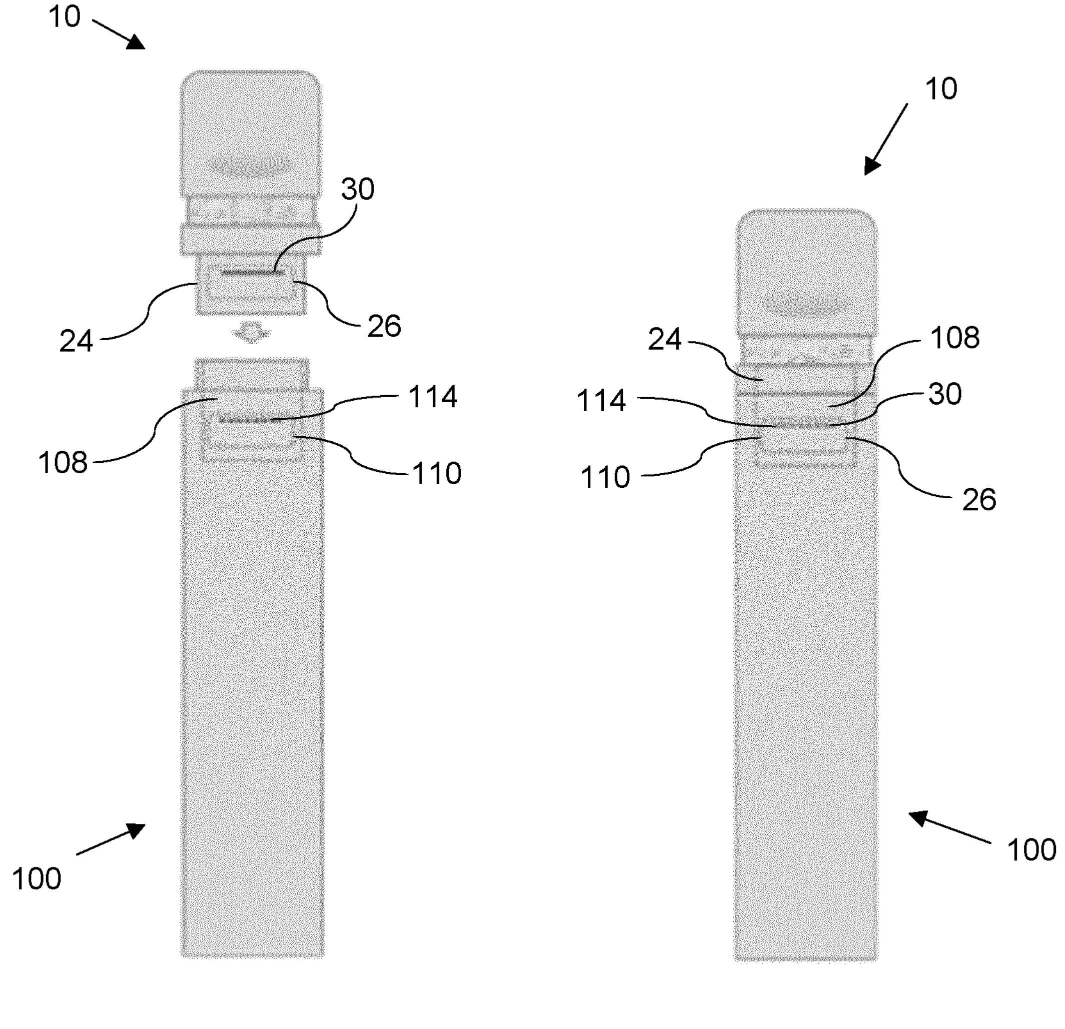
FIG. 3A is a plan view of the cartridge of FIG. 1 and the aerosol-generating device of FIG. 2 with the cartridge removed from the device.
FIG. 3B is a plan view of the cartridge of FIG. 1 connected to the aerosol-generating device of FIG. 2.

FIGS. 3A and 3B are plan views of the cartridge 10 of FIG. 1 and the aerosol-generating device 100 of FIG. 2 in two different configurations, that is, an unconnected configuration and a connected configuration respectively. In FIG. 3A, the cartridge 10 is shown separated from the aerosol-generating device 100 and being inserted into the aerosol-generating device 100. In particular, the connection portion 24 of the cartridge 10 is being inserted into the cavity 108 of the aerosol-generating device 100. The cartridge 10 is being inserted to bring the depression 26 on the connection portion 24 into mating or interlocking engagement with the projection 110 on the side wall of the cavity 108 of the aerosol-generating device 100 in order to bring the first electromagnetic information marker 30 on the cartridge 10 into overlapping alignment with the second electromagnetic information marker 114 in the cavity 108.

In FIG. 3B, the cartridge 10 is shown connected to the aerosol-generating device 100 with the connection portion 24 of the cartridge 10 received within the cavity 108 of the aerosol-generating device 100. In this configuration, the projection 110 on the side wall of the cavity 108 has been brought into mating or interlocking engagement with depression 26 on the connection portion 24 such that the edges or perimeters of the depression 26 and projection 110 are coincident. The complementary shapes of the cavity 108 and the projection portion 24 together with the complementary shapes of the depression 26 and projection 110 help to achieve a form-fit connection between the cartridge 10 and aerosol-generating device 100. This form-fit connection helps to retain the cartridge 10 securely within the aerosol-generating device 100 to reduce the risk of the cartridge 10 being inadvertently dislodged from the aerosol-generating device 100. Furthermore, the form-fit connection also helps to bring the first 30 and second 114 electromagnetic information markers into an aligned or overlapping engagement such that the markers 30 and 114 can be interrogated by a magnetic field produced by an induction coil (not shown) located in the walls of the cavity 108 of the aerosol-generating device 100. The first 30 and second 114 electromagnetic information markers are shown coincident in FIG. 3B.

The induction coil (not shown) is located in the wall of the cavity 108 in proximity to the second electromagnetic information marker 114 and is configured to provide an alternating magnetic field to the first 30 and second 114 electromagnetic information markers when the first 30 and second 114 electromagnetic information markers are in the configuration shown in FIG. 3B. The alternating magnetic field is in the frequency range of 10 hertz to 20 kilohertz. Magnetic interaction between the first 30 and second 114 electromagnetic information markers generates harmonic excitation frequencies, which are radiated or emitted as an alternating electromagnetic signal having a characteristic spectrum and frequency response. The frequency response can be predetermined through the particular choice of material composition used for the first 30 and second 114 electromagnetic information markers as well as their structure or shape, as discussed further below. The predetermined frequency response provides an indication of the information stored in the first electromagnetic information marker 30.

The electromagnetic signal emitted by the first 30 and second 114 electromagnetic information markers can be detected or received by the induction coil (not shown) in the cavity 108 of the aerosol-generating device 100 or a second induction coil (not shown) in the cavity 108 specifically configured to receive the signal. The electromagnetic signal induces an electrical voltage in the receiving induction coil, which is then passed to the control circuitry 106 (see FIG. 2) to process the frequency response.

The predetermined frequency response can be used to store binary encoded information. For example, if a predetermined frequency response is generated, this may indicate a 'true' or 'ON' condition or binary digit '1'. If a predetermined frequency response is not generated, or a different frequency response is generated, this may indicate a 'false' or 'OFF' condition or binary digit '0'. A binary digit '1' may indicate that a correct or legitimate cartridge has been inserted in the aerosol-generating device 100 and a binary digit '0' may indicate that an incorrect or third party cartridge has been inserted. The first electromagnetic information marker 30 is therefore able to encode at least one bit of data.

Figure 4:
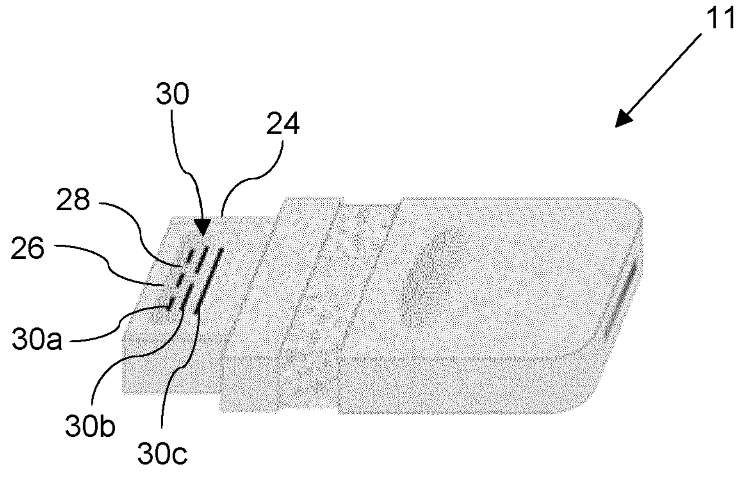
FIG. 4 is a perspective view of a cartridge for an aerosol-generating system according to another example of the present disclosure.
Figure 5:
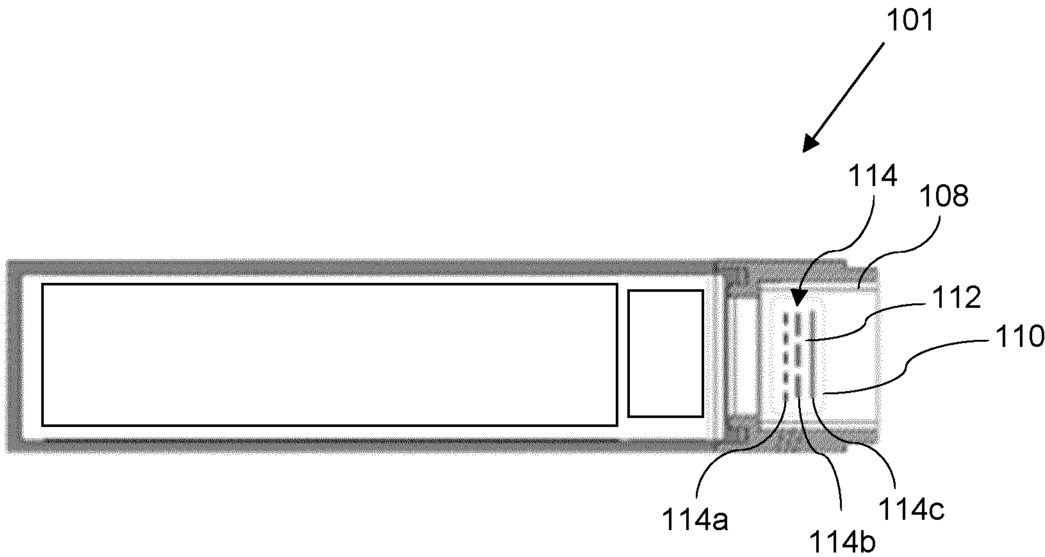
FIG. 5 is a longitudinal cross-sectional view of an aerosol-generating device for use with the cartridge of FIG. 4.

Referring to FIG. 4, there is shown another example cartridge 11 for use with the aerosol-generating device 101 of FIG. 5. When combined, the cartridge 11 of FIG. 4 and the aerosol-generating device 101 of FIG. 5 form an aerosol-generating system. The cartridge 11 of FIG. 4 is similar to the cartridge 10 of FIG. 1 and like reference numerals have been used to identify like components. The cartridge 11 of FIG. 4 differs from that of FIG. 1 in that the first electromagnetic information marker 30 comprises three first electromagnetic information sub-markers 30*a* to 30*c*. Each of the first electromagnetic information sub-markers 30*a* to 30*c* is configured to store information regarding the cartridge 11 and comprises a metallic ink which is printed or otherwise deposited onto the planar base 28 of the depression 26 formed on the connection portion 24 of the cartridge 11. Further details of the materials from which each of the first electromagnetic information sub-markers 30*a* to 30*c* can be made are provided below with reference to FIG. 8.

Each of the first electromagnetic information sub-markers 30*a* to 30*c* extend in a widthwise direction across a portion of the connection portion 24 of the cartridge 11 but have different forms or structures. Two of the first electromagnetic information sub-markers 30*a* and 30*b* have different broken line structures and the remaining first electromagnetic information sub-marker 30*c* has a continuous line structure. The purpose of the different structures is to generate different frequency responses and different patterns of harmonic excitation frequencies when the first electromagnetic information sub-markers 30*a* to 30*c* magnetically interact with corresponding second electromagnetic information sub-markers in the aerosol-generating device, as described below. The different frequency responses and different patterns of harmonic excitation frequencies enable the first electromagnetic information sub-markers 30*a* to 30*c* to be distinguished from each other and to be individually read. The different frequency responses and different patterns of harmonic excitation frequencies can also be used to identify the cartridge 11.

FIG. 5 is a longitudinal cross-sectional view of the aerosol-generating device 101 for use with the cartridge 11 of FIG. 4. The aerosol-generating device 101 is similar to the aerosol-generating device 100 of FIG. 2 and like reference numerals have been used to identify like components. The aerosol-generating device 101 of FIG. 5 differs from that of FIG. 2 in that the second electromagnetic information marker 114 comprises three second electromagnetic information sub-markers 114*a* to 114*c*. Each of the second electromagnetic information markers 114*a* to 114*c* is provided on the planar top 112 of the projection 110 located on a side wall of the cavity 108 of the aerosol-generating device 101. Each of the second electromagnetic information markers 114*a* to 114*c* comprises a metallic ink which is printed or otherwise deposited onto the planar top 112 of the projection 110.

Each of the second electromagnetic information markers 114*a* to 114*c* is positioned in the cavity 108 to match a corresponding one of the first electromagnetic information sub-markers 30*a* to 30*c* on the connection portion 24 of the cartridge 11 of FIG. 4. When the connection portion 24 of the cartridge 11 is received within the cavity 108 of the aerosol-generating device 101, each of the first electromagnetic information sub-markers 30*a* to 30*c* is aligned parallel with, and substantially overlies or overlaps, a corresponding one of the second electromagnetic information sub-markers 114. Further details of the materials from which the second electromagnetic information sub-marker s114 are made are provided below with reference to FIG. 8.

Each of the second electromagnetic information markers 114*a* to 114*c* extend in a widthwise direction across a portion of the cavity 108 but have different forms or structures. Similar to the cartridge 11 of FIG. 4, two of the second electromagnetic information sub-markers 114*a* and 114*b* of the aerosol-generating device 101 of FIG. 5 have different broken line structures and the remaining second electromagnetic information sub-marker 114*c* has a continuous line structure. As for the cartridge 11, the purpose of the different structures is to generate different frequency responses and different patterns of harmonic excitation frequencies when the first electromagnetic information sub-markers 30*a* to 30*c* magnetically interact with the second electromagnetic information sub-markers 114*a* to 114*c*.

One or more induction coils (not shown) are also located in the wall of the cavity 108 of the aerosol-generating device 101 in proximity to the second electromagnetic information marker 114. The one or more induction coils are configured to act as a data reader and to provide an alternating magnetic field to the first 30 and second 114 electromagnetic information markers such that the information stored by the first electromagnetic information sub-marker 30*a* to 30*c* can be read by magnetic interaction between the first electromagnetic information sub-markers 30*a* to 30*c* and corresponding ones of the second electromagnetic information sub-markers 114*a* to 114*c* when the connection portion 24 of the cartridge 11 is received within the cavity 108 of the aerosol-generating device 101, as discussed further below with reference to FIG. 6B.

Figures 6A, 6B:
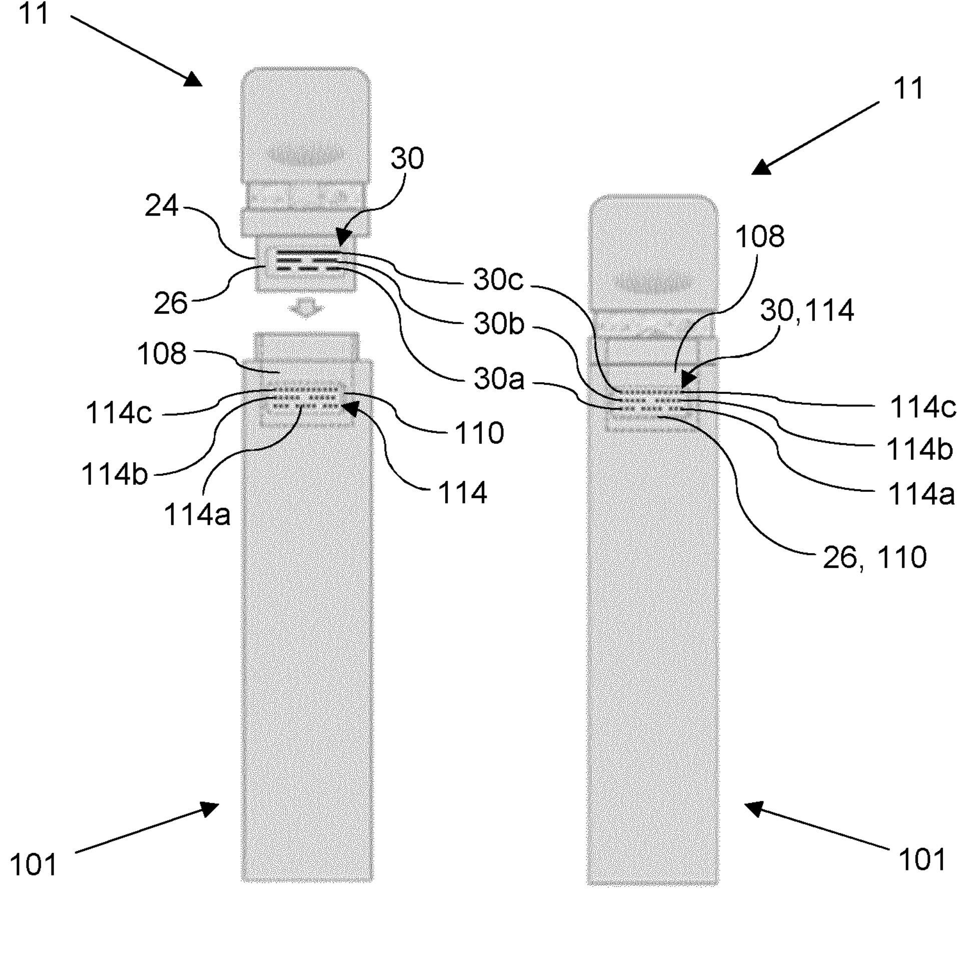
FIG. 6A is a plan view of the cartridge of FIG. 4 and the aerosol-generating device of FIG. 5 with the cartridge removed from the device.
FIG. 6B is a plan view of the cartridge of FIG. 4 connected to the aerosol-generating device of FIG. 5.

FIGS. 6A and 6B are plan views of the cartridge 11 of FIG. 4 and the aerosol-generating device 101 of FIG. 5 in an unconnected configuration and a connected configuration respectively. In FIG. 6A, the cartridge 11 is shown separated from the aerosol-generating device 101 and being inserted into the aerosol-generating device 101. In particular, the connection portion 24 of the cartridge 11 is being inserted into the cavity 108 of the aerosol-generating device 101. The cartridge 11 is being inserted to bring the depression 26 on the connection portion 24 into mating or interlocking engagement with the projection 110 on the side wall of the cavity 108 of the aerosol-generating device 101 in order to bring each of the first electromagnetic information sub-markers 30*a* to 30*c* on the cartridge 11 into overlapping alignment with corresponding ones of the second electromagnetic information sub-markers 114*a* to 114*c* in the cavity 108.

In FIG. 6B, the cartridge 11 is shown connected to the aerosol-generating device 101 with the connection portion 24 of the cartridge 11 received within the cavity 108 of the aerosol-generating device 101. In this configuration, the projection 110 on the side wall of the cavity 108 has been brought into mating or interlocking engagement with depression 26 on the connection portion 24 such that the edges or perimeters of the depression 26 and projection 110 are coincident. The complementary shapes of the cavity 108 and the projection portion 24 together with the complementary shapes of the depression 26 and projection 110 help to achieve a form-fit connection between the cartridge 11 and aerosol-generating device 101. This form-fit connection helps to retain the cartridge 11 securely within the aerosol-generating device 101 to reduce the risk of the cartridge 11 being inadvertently dislodged from the aerosol-generating device 101. Furthermore, the form-fit connection also helps to bring the first electromagnetic information sub-markers 30*a* to 30*c* into an aligned or overlapping engagement with corresponding ones of the second electromagnetic information sub-markers 114*a* to 114*c* such that the sub-markers 30*a* to 30*c* and 114*a* to 114*c* can be interrogated by a magnetic field produced by the one or more induction coils (not shown) located in the walls of the cavity 108 of the aerosol-generating device 101. The first 30*a* to 30*c* and second 114*a* to 114*c* electromagnetic information sub-markers are shown coincident in FIG. 6B.

The one or more induction coils (not shown) are located in the wall of the cavity 108 in proximity to the second electromagnetic information sub-markers 114*a* to 114*c* and is configured to provide an alternating magnetic field to the first 30*a* to 30*c* and second 114*a* to 114*c* electromagnetic information sub-markers when the first 30 and second 114 electromagnetic information markers are in the configuration shown in FIG. 6B. The alternating magnetic field is in the frequency range of 10 hertz to 20 kilohertz. One induction coil may be provided for each pair of corresponding first 30*a* to 30*c* and second 114*a* to 114*c* electromagnetic information sub-markers. Alternatively, a single induction coil may be provided to read all of the first 30*a* to 30*c* and second 114*a* to 114*c* electromagnetic information sub-markers and may use different frequencies for each pair of corresponding first 30*a* to 30*c* and second 114*a* to 114*c* electromagnetic information sub-markers.

Each pair of corresponding first 30*a* to 30*c* and second 114*a* to 114*c* electromagnetic information sub-markers functions in the same way as the first 30 and second 114 electromagnetic information markers of FIG. 3B. Magnetic interaction between the first 30*a* to 30*c* and second 114*a* to 114*c* electromagnetic information sub-markers generates harmonic excitation frequencies, which are radiated or emitted as an alternating electromagnetic signal having a characteristic spectrum and frequency response. The frequency response can be predetermined through the particular choice of material composition used for the first 30*a* to 30*c* and second 114*a* to 114*c* electromagnetic information sub-markers as well as their structure or shape. As mentioned above, each of the first electromagnetic information sub-markers 30*a* to 30*c* and their corresponding second electromagnetic information sub-markers 114*a* to 114*c* has a different structure and therefore each will generate a different predetermined frequency response which can be individually read. The predetermined frequency response provides an indication of the information stored in the first electromagnetic information sub-markers 30*a* to 30*c*.

The electromagnetic signal emitted by the first 30*a* to 30*c* and second 114*a* to 114*c* electromagnetic information sub-markers can be detected or received by the one or more induction coils (not shown) in the cavity 108 of the aerosol-generating device 101. Alternatively, one or more second induction coils (not shown) may be provided in the cavity 108 and be specifically configured to receive the signal emitted by the first 30*a* to 30*c* and second 114*a* to 114*c* electromagnetic information sub-markers. The electromagnetic signal induces an electrical voltage in the receiving induction coil or coils, which is then passed to the control circuitry 106 (see FIG. 5) to process the frequency response.

Similar to the example in FIG. 3B, the predetermined frequency response of each pair of corresponding first 30*a* to 30*c* and second 114*a* to 114*c* electromagnetic information sub-markers in FIG. 6B can be used to store binary encoded information. Each pair of corresponding first 30*a* to 30*c* and second 114*a* to 114*c* electromagnetic information sub-markers is able to encode at least one bit of data and therefore the first 30 and second 114 electromagnetic information markers in the examples of FIGS. 4 to 6B are able to encode at least 3 bits of data, that is, one bit for each corresponding pair of sub-markers. Although FIGS. 4 to 6B shows the cartridge 11 comprising three first electromagnetic information sub-markers 30*a* to 30*c*, it will be appreciated that any suitable number of first electromagnetic information sub-markers 30*a* to 30*c* and corresponding second electromagnetic information sub-markers 114*a* to 114*c* may be provided to encode N number of bits.

Figure 7:
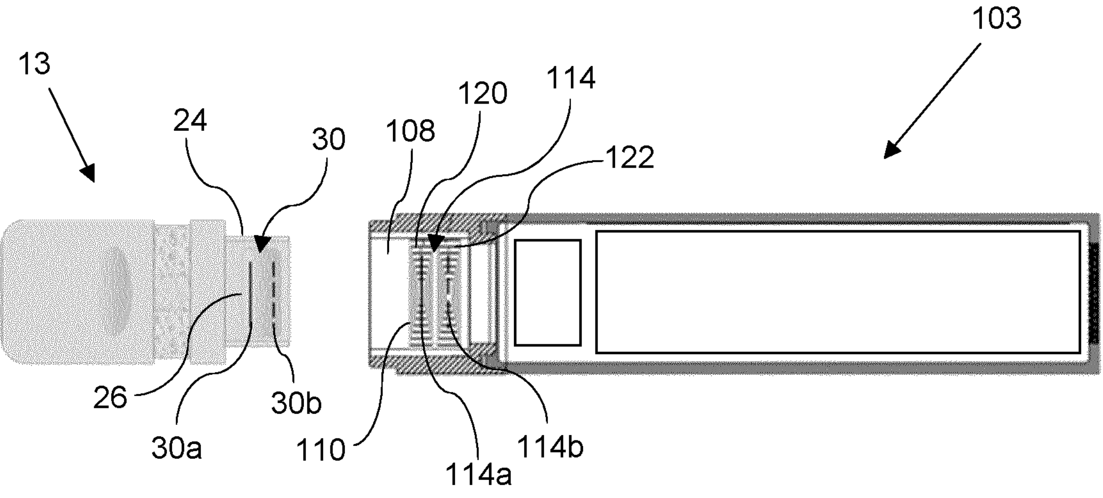
FIG. 7 is a plan view of an aerosol-generating system according to another example of the present disclosure in which the cartridge is shown removed from the aerosol-generating device.

FIG. 7 is a plan view of an aerosol-generating system comprising another example cartridge 13 and aerosol-generating device 103. The cartridge 13 is shown removed from the aerosol-generating device 103. The cartridge 13 of FIG. 7 is similar to the cartridge 11 of FIG. 4 and like reference numerals have been used to identify like components. The cartridge 13 of FIG. 7 differs from that of FIG. 4 in that the first electromagnetic information marker 30 comprises two first electromagnetic information sub-markers 30*a* and 30*b*. Similar to the example in FIG. 4, the first electromagnetic information sub-markers 30*a* and 30*b* have different structures to generate different frequency responses. The aerosol-generating device 103 is similar to the aerosol-generating device 101 of FIG. 5 and like reference numerals have been used to identify like components. The aerosol-generating device 103 of FIG. 7 differs from that of FIG. 5 in that the second electromagnetic information marker 114 comprises two second electromagnetic information sub-markers 114*a* and 114*b*. Similar to the example in FIG. 5, the second electromagnetic information sub-markers 114*a* and 114*b* have different structures to generate different frequency responses.

First and second induction coils 120, 122 are located on or in a side wall of the cavity 108 of the aerosol-generating device 103 in proximity to the second electromagnetic information sub-markers 114*a* and 114*b*. The first 120 and second 122 induction coils are configured to act as a data reader and provide an alternating magnetic field to the first 30*a* and 30*b* and second 114*a* and 114*b* electromagnetic information sub-markers when the connection portion 24 of the cartridge 13 is received in the cavity 108 of the aerosol-generating device 103. One induction coil is provided for each corresponding pair of first 30, 30*b* and second 114*a*, 114*b* electromagnetic information sub-markers. The first induction coil 120 is arranged to read information from the first electromagnetic information sub-marker 30*a* by magnetic interaction between the first electromagnetic information sub-marker 30*a* and the second electromagnetic information sub-marker 114*a*. The second induction coil 122 is arranged to read information from the first electromagnetic information sub-marker 30*b* by magnetic interaction between the first electromagnetic information sub-marker 30*b* and the second electromagnetic information sub-marker 114*b*.

The first 120 and 122 induction coils are substantially planar and have a spiral shape to conform to the planar side wall of the cavity of the aerosol-generating device 103. However, it will be appreciated that other shapes of induction coil may be used, for example, a helical coil extending around the perimeter of the cavity of the aerosol-generating device 103. The induction coils 120, 122 and first 30*a*, 30*b* and second 114*a*, 114*b* electromagnetic information sub-markers function in the same manner as those described with reference to FIGS. 5 and 6B above. Further induction coils (not shown) may be provided to receive the electromagnetic signals emitted by the first 30*a*, 30*b* and second 114*a*, 114*b* electromagnetic information sub-markers.

For clarity, FIG. 7 shows the first electromagnetic information marker 30 on an upper side of the cartridge 13 and the second electromagnetic information marker 114 also on an upwardly facing sidewall of the cavity 108 of the aerosol-generating device 103. It would not be possible to connect the cartridge 13 and aerosol-generating device 103 in these orientations because the depression 26 on the connection portion 24 of the cartridge 13 is not on the same side as the projection 110 on the side wall of the cavity 108 of the aerosol-generating device 103. However, it will be appreciated that the cartridge 13 would be flip 180 degrees about its longitudinal axis in order to insert the connection portion 24 into the cavity 108 of the aerosol-generating device 103. This would then bring the first electromagnetic information marker 30 into overlapping engagement with the second electromagnetic information marker 114. Alternatively, a depression and first electromagnetic information marker could be provided on both opposing sides of the connection portion 24 of the cartridge 13 so that the cartridge 13 can be connected in either orientation.

Figure 8:
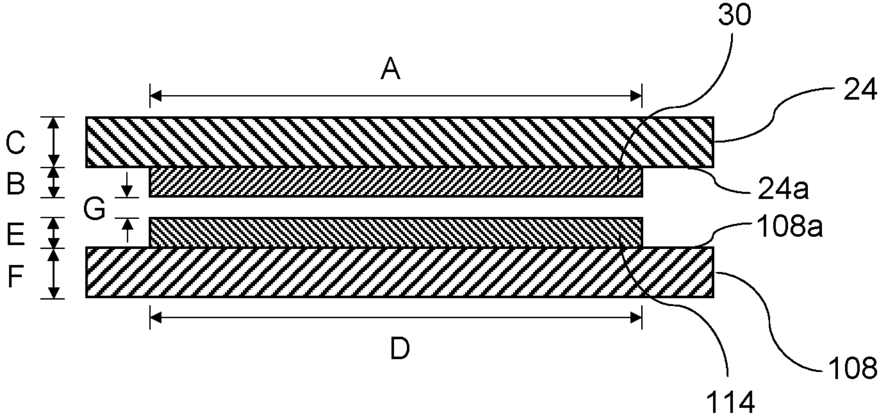
FIG. 8 is a schematic partial cross-sectional view through a wall of a cartridge and a wall of an aerosol-generating device showing electromagnetic information markers arranged on the walls.

FIG. 8 is a schematic partial cross-sectional view through a wall of a connection portion 24 of a cartridge and a side wall of a cavity 108 of an aerosol-generating device when the cartridge and aerosol-generating device are connected, for example, as shown in FIGS. 3B and 6B. It will be appreciated that FIG. 8 only shows certain parts of the connection portion 24 and cavity 108 and that the figure is schematic such that features are not necessarily drawn to scale and other features of the connection portion 24 and cavity 108 such as the depression and projection have been omitted. A first electromagnetic information marker or sub-marker 30 is arranged on an external planar surface 24*a* of the connection portion 24 of the cartridge, which surface 24*a* acts as a substrate for depositing the first electromagnetic information marker or sub-marker 30. The first electromagnetic information marker or sub-marker 30 is formed on the planar surface 24*a* with a constant width A and thickness B, which thickness B is substantially lower than the thickness C of the wall of the connection portion 24 of the cartridge such that the first electromagnetic information marker or sub-marker 30 does not appreciably increase the dimensions of the connection portion 24.

As mentioned above, the walls of the connection portion 24 of the cartridge comprise a rigid polymer such as PEEK. However, it will be appreciated that the walls of the connection portion 24 can also be made of a metallic material coated with a polymeric layer, or a layer of any material acting as a coating such as paint or varnish, on the top of which the first electromagnetic information marker or sub-marker 30 is applied. The first electromagnetic information marker or sub-marker 30 comprises a first metallic material in the form of a metallic ink or paste which is deposited or printed on the planar surface 24*a* and then cured. Alternatively, the first electromagnetic information marker or sub-marker 30 comprises a first metallic material applied as a metallic tape or foil. The first metallic material comprises components of an easily magnetisable or soft magnetic material and a non-magnetostrictive amorphous metal. An example of a suitable amorphous metal is METGLAS™ 2714A manufactured by METGLAS™ Inc. of Conway, South Carolina, USA.

A second electromagnetic information marker or sub-marker 114 is arranged on an internal planar surface 108*a* of the cavity 108 of the aerosol-generating device, which surface 108*a* acts as a substrate for depositing the second electromagnetic information marker or sub-marker 114. The second electromagnetic information marker or sub-marker 114 is formed on the planar surface 108*a* with a constant width D and thickness E, which thickness E is substantially lower than the thickness F of the wall of the cavity 108 of the aerosol-generating device such that the second electromagnetic information marker or sub-marker 114 does not appreciably change the internal dimensions of the cavity 108. In FIG. 8, the first electromagnetic information marker or sub-marker 30 is shown separated from the second electromagnetic information marker or sub-marker 114 by a distance G, which is typically around 1 millimetre or less. However, it will be appreciated that the first electromagnetic information marker or sub-marker 30 and the second electromagnetic information marker or sub-marker 114 may actually be in contact such that distance G is zero.

As mentioned above, the walls of the cavity 108 of the aerosol-generating device comprise a rigid polymer such as PEEK. However, it will be appreciated that the walls of the cavity 108 can also be made of a metallic material coated with a polymeric layer such as a foil or laminated foil, on the top of which the second electromagnetic information marker or sub-marker 114 is applied. The second electromagnetic information marker or sub-marker 114 comprises a second metallic material in the form of a metallic ink or paste which is deposited or printed on the planar surface 108*a* and then cured. Alternatively, the second electromagnetic information marker or sub-marker 114 comprises a second metallic material applied as a metallic tape or foil. The second metallic material comprises a ferromagnetic material having a higher magnetic coercivity than the first metallic material such that the second metallic material has a higher magnetic hardness than the first metallic material, that is, the second metallic material is a hard magnetic material relative to the first metallic material. The magnetic coercivity of the second metallic material is greater than 5500 amperes per metre and is preferably greater than 7100 amperes per metre.

FIG. 8 shows the connection portion 24 of the cartridge correctly inserted within the cavity 108 of the aerosol-generating device such that the first 30 and second 114 electromagnetic information marker or sub-markers are coincident, that is, they are in overlying or overlapping alignment. When an alternating magnetic field in the frequency range of 10 hertz to 20 kilohertz is applied to the first 30 and second 114 electromagnetic information markers or sub-markers in the configuration shown in FIG. 8, magnetic interaction between the first 30 and second 114 electromagnetic information markers or sub-markers generates harmonic excitation frequencies, which are radiated or emitted as an alternating electromagnetic signal having a characteristic spectrum and frequency response.

As discussed above, the frequency response can be predetermined through the choice of composition of the first and second metallic materials as well as their structure or shape. Although FIG. 8 shows the first 30 and second 114 electromagnetic information markers or sub-markers having the structure of a continuous line, it will be appreciated the first 30 and second 114 electromagnetic information markers or sub-markers may have different structures, for example, the broken line structures shown in FIGS. 4 to 7. Furthermore, there may be multiple pairs of first 30 and second 114 electromagnetic information markers or sub-markers to encode as many bits of data as necessary.

When the first 30 and second 114 electromagnetic information markers or sub-markers are configured to generate harmonic excitation frequencies, the first 30 and second 114 electromagnetic information markers or sub-markers are said to be in an active state. In the active state, the second electromagnetic information marker or sub-marker 114 is not magnetised. The first 30 and second 114 electromagnetic information markers or sub-markers can be "rewritten" by altering or deactivating the state of the first 30 and second 114 electromagnetic information markers or sub-markers. The first 30 and second 114 electromagnetic information markers or sub-markers can be deactivated by exposing the second electromagnetic information marker or sub-marker 114 to a permanent magnetic field, which magnetises the second electromagnetic information marker or sub-marker 114. The magnetised second electromagnetic information marker or sub-marker 114 holds the soft magnetic material of the first electromagnetic information marker or sub-marker 30 in saturation so that it can no longer follow a change in magnetisation by an external field and therefore no longer generates harmonic oscillations.

Therefore, pairs of corresponding first 30 and second 114 electromagnetic information markers can either be 'ON' or 'OFF' to encode different information on the cartridge, for example, the manufacturer's identity or location or information regarding the contents of the cartridge. Any suitable number of pairs of corresponding first 30 and second 114 electromagnetic information markers can be used to encode the necessary information. Furthermore, the second electromagnetic information marker or sub-marker 114 can be deactivated, that is, magnetised by an induction coil within the device. This can be used to record information on the cartridge during use, for example, if an adverse event occurred that affected the cartridge or if the liquid aerosol-forming substrate in the cartridge is depleted such that the cartridge needs replacing. The aerosol-generating device can then recognise affected or depleted cartridges at a later time and prevent further use of the cartridge. Furthermore, different arrangements or superposition of different sections of the second electromagnetic information marker or sub-marker 114 along the first electromagnetic information marker or sub-marker 30 also result in different patterns of harmonic oscillations, which can be used to distinguish between different cartridges.

Figure 9:
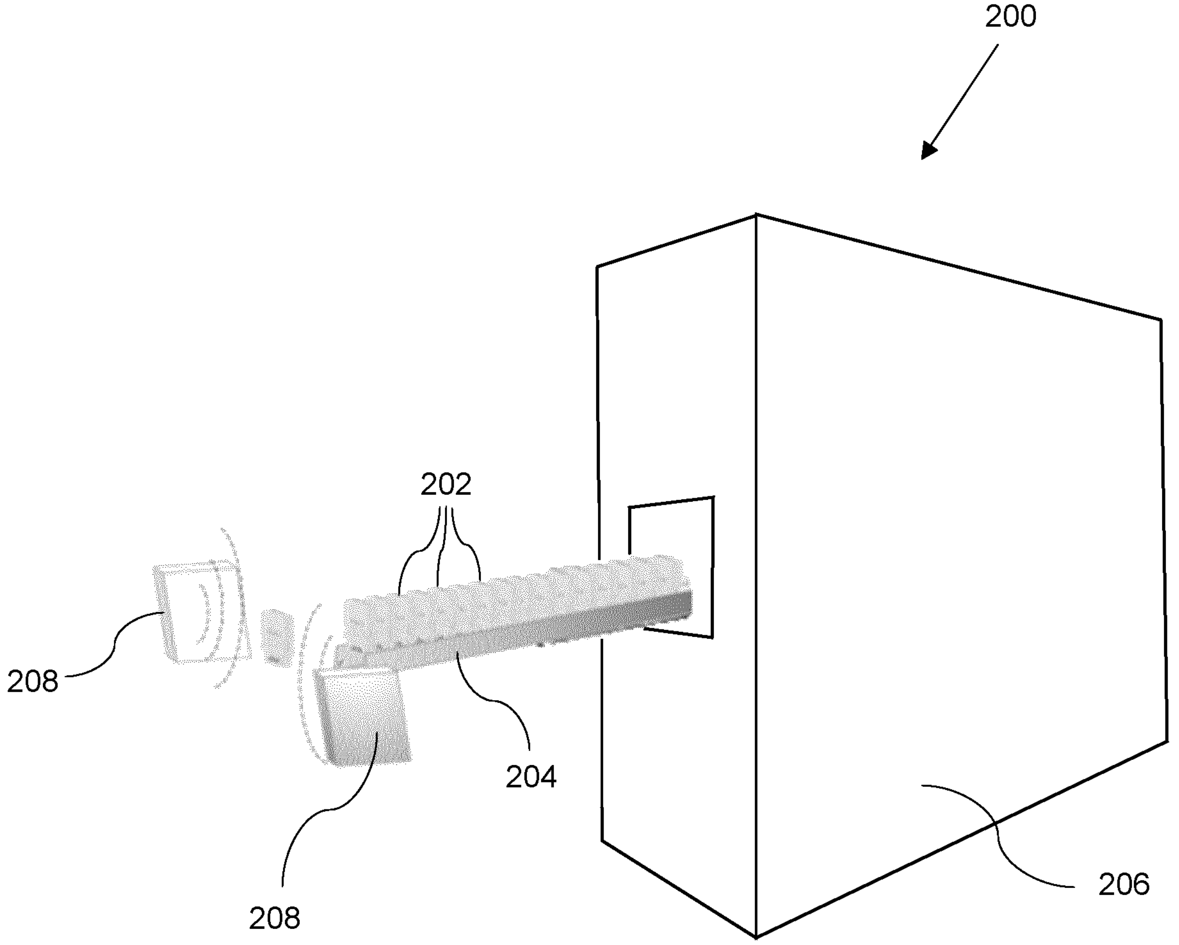
FIG. 9 is a schematic perspective view of a production line for an aerosol-generating system according to an example of the present disclosure.

FIG. 9 is a schematic perspective view of part of a production line 200 for an aerosol-generating system. A plurality of cartridges or aerosol-generating systems 202 are arranged on a conveyor belt 204 and are being fed into a dosing and filling station 206 for the cartridges to fill the cartridges or aerosol-generating systems 202 with liquid aerosol-forming substrate. The cartridges or aerosol-generating systems 202 have been provided with electromagnetic information markers in accordance with examples of the present disclosure. A pair of induction coils 208 have been placed along the path of the cartridges or aerosol-generating systems 202 and are configured to emit a magnetic field to change the magnetic state of ferromagnetic materials present in the electromagnetic information markers. By activating or deactivating magnetically the electromagnetic information markers, information can be encoded on the cartridges which can be used to identify the cartridge as genuine or not and provide other information regarding the cartridge such as its contents and that it is a fresh cartridge that has not been used. The information encoded on the cartridge can also be used to specify whether the cartridge conforms with appropriate quality assurance requirements. This information can then be read by an aerosol-generating device when the cartridge is properly connected to the aerosol-generating device.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±5% of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An aerosol-generating system comprising a cartridge and an aerosol-generating device, the cartridge comprising:
- an aerosol-forming substrate;
- a cartridge body for holding the aerosol-forming substrate; and
- a first electromagnetic information marker;
- wherein the cartridge body comprises a connection portion configured to be received within a cavity of the aerosol-generating device, the first electromagnetic information marker being disposed on a surface of the connection portion;
- the aerosol-generating device comprising:
- a housing having the cavity configured to receive at least a portion of the cartridge;
- a second electromagnetic information marker; and
- a data reader configured to apply an alternating magnetic field to the first and second electromagnetic information markers when the connection portion of the cartridge is received in the cavity;
- wherein the first and second electromagnetic information markers are positioned such that, when the at least a portion of the cartridge is received within the cavity of the aerosol-generating device, the first electromagnetic information marker at least partially overlaps the second electromagnetic information marker to enable information stored by the first electromagnetic information marker to be read by magnetic interaction with the second electromagnetic information marker;
- wherein the data reader is configured to read the information from the first electromagnetic information marker by monitoring a response signal of the first and second electromagnetic information markers.

2. The aerosol-generating system according to claim 1, wherein the second electromagnetic information marker is disposed on a surface of the cavity, the surface of the cavity opposing the surface of the connection portion on which the first electromagnetic information marker is disposed when the connection portion is received within the cavity of the aerosol-generating device.

3. The aerosol-generating system according to claim 1, wherein the first and second electromagnetic information markers are disposed on planar surfaces of the connection portion and cavity respectively.

4. The aerosol-generating system according to claim 1, wherein the first and second electromagnetic information markers are disposed on rigid surfaces of the connection portion and cavity respectively.

5. The aerosol-generating system according to claim 1, wherein the first and second electromagnetic information markers comprise a metallic ink deposited on plastic portions of the connection portion and cavity respectively.

6. The aerosol-generating system according to claim 1, wherein the connection portion of the cartridge has a cuboid shape.

7. The aerosol-generating system according to claim 1, wherein the connection portion of the cartridge is configured to make a form-fit connection with the cavity of the aerosol-generating device and wherein the first and second electromagnetic information markers at least partially overlap when the form-fit connection is made.

8. The aerosol-generating system according to claim 1, wherein the first electromagnetic information marker comprises a first metallic material and the second electromagnetic information marker comprises a second metallic material, the second metallic material having a higher magnetic coercivity than the first metallic material.

9. The aerosol-generating system according to claim 8, wherein the first metallic material comprises an amorphous metal.

10. The aerosol-generating system according to claim 1, wherein the first electromagnetic information marker comprises a plurality of first electromagnetic information sub-markers and the second electromagnetic information marker comprises a corresponding plurality of second electromagnetic information sub-markers, wherein the first and second electromagnetic information markers are positioned such that, when the at least a portion of the cartridge is received within the cavity of the aerosol-generating device, each of the plurality of first electromagnetic information sub-markers at least partially overlaps a corresponding one of the plurality of second electromagnetic information sub-markers.

11. The aerosol-generating system according to claim 10, wherein each first electromagnetic information sub-marker and a corresponding one of the second electromagnetic information sub-markers together store 1 bit of data.

* * * * *